United States Patent
Banno et al.

(10) Patent No.: US 11,034,374 B2
(45) Date of Patent: Jun. 15, 2021

(54) STEERING WHEEL

(71) Applicant: TOYODA GOSEI CO., LTD., Kiyosu (JP)

(72) Inventors: Yoshiteru Banno, Kiyosu (JP); Norio Umemura, Kiyosu (JP); Atsushi Nagata, Kiyosu (JP); Naoki Tsukamoto, Kiyosu (JP); Norio Mizuno, Kiyosu (JP); Hiroyuki Yamada, Kiyosu (JP); Kazuhiro Terada, Kiyosu (JP); Shun Takeuchi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 251 days.

(21) Appl. No.: 16/050,397

(22) Filed: Jul. 31, 2018

(65) Prior Publication Data

US 2019/0047604 A1 Feb. 14, 2019

(30) Foreign Application Priority Data

Aug. 10, 2017 (JP) .............................. JP2017-155994
Sep. 15, 2017 (JP) .............................. JP2017-177723

(51) Int. Cl.
  *B62D 1/04* (2006.01)
  *B62D 7/22* (2006.01)
  (Continued)

(52) U.S. Cl.
  CPC ............ *B62D 1/046* (2013.01); *B60R 16/027* (2013.01); *B60R 21/2037* (2013.01); *B62D 7/222* (2013.01); *B60R 2021/01006* (2013.01)

(58) Field of Classification Search
  CPC .... B62D 1/046; B62D 27/222; B60R 16/027; B60R 21/2037; B60R 2021/01006
  See application file for complete search history.

(56) References Cited

U.S. PATENT DOCUMENTS 4,607,898 A * 8/1986 Reighard .............. B60R 16/027
 439/15
5,226,830 A * 7/1993 Ueno ................... H01R 35/025
 439/15

(Continued)

FOREIGN PATENT DOCUMENTS

JP S60-037192 U 3/1985
JP 3027413 U 5/1996

(Continued)

OTHER PUBLICATIONS

Office action dated Aug. 4, 2020 issued in corresponding JP patent application No. 2017-177723 (and English translation).

(Continued)

*Primary Examiner* — Zakaria Elahmadi
(74) *Attorney, Agent, or Firm* — Posz Law Group, PLC

(57) ABSTRACT

A steering wheel includes a functional device and a control device, which is electrically connected to the functional device. The functional device includes a functional case, which constitutes a housing of the functional device. The control device includes a control case, which constitutes a housing of the control device. A first connector is partially exposed to an outside of the functional case. A second connector is partially exposed to an outside of the control case. The first connector is coupled to the second connector, so that the functional device is electrically connected to the control device without a harness between the functional case and the control case.

3 Claims, 14 Drawing Sheets

(51) Int. Cl.
    *B60R 21/203*         (2006.01)
    *B60R 16/027*         (2006.01)
    *B60R 21/01*           (2006.01)

(56) References Cited

U.S. PATENT DOCUMENTS

| | | | | |
|---|---|---|---|---|
| 5,303,952 | A * | 4/1994 | Shermetaro | B60Q 1/0082 200/61.55 |
| 5,505,483 | A | 4/1996 | Taguchi et al. | |
| 5,577,768 | A | 11/1996 | Taguchi et al. | |
| 5,616,045 | A * | 4/1997 | Gauker | B60R 21/017 439/352 |
| 5,651,687 | A * | 7/1997 | Du-Rocher | B60R 16/027 439/15 |
| 5,704,633 | A * | 1/1998 | Durrani | B60R 16/027 280/728.2 |
| 5,936,215 | A | 8/1999 | Masuda et al. | |
| 6,062,592 | A * | 5/2000 | Sakurai | B60Q 5/003 280/728.2 |
| 6,325,408 | B1 * | 12/2001 | Ford | B60R 21/2035 280/728.2 |
| 6,491,321 | B1 * | 12/2002 | Nakashima | B01D 46/4218 280/736 |
| 6,554,312 | B2 * | 4/2003 | Sakane | B60Q 5/003 280/728.2 |
| 6,666,721 | B1 * | 12/2003 | Jakob | F42B 3/103 102/202.9 |
| 7,533,897 | B1 * | 5/2009 | Xu | B60Q 5/003 280/728.2 |
| 7,592,557 | B2 * | 9/2009 | Cortina | B60Q 5/003 200/61.54 |
| 8,448,982 | B2 * | 5/2013 | Yamaji | B60R 21/2037 280/728.2 |
| 2001/0007402 | A1 * | 7/2001 | Imai | B60Q 1/1469 310/91 |
| 2002/0011721 | A1 * | 1/2002 | Kikuta | B60Q 5/003 280/731 |
| 2002/0079203 | A1 * | 6/2002 | Kikuta | B60Q 5/003 200/61.54 |
| 2002/0151192 | A1 * | 10/2002 | Canuto | B60R 16/027 439/34 |
| 2004/0083849 | A1 * | 5/2004 | Umemura | B62D 1/11 74/552 |
| 2004/0113406 | A1 * | 6/2004 | Elqadah | B60R 21/276 280/739 |
| 2005/0106913 | A1 * | 5/2005 | Khoury | H01H 1/5805 439/164 |
| 2006/0027448 | A1 * | 2/2006 | Helmstetter | B60R 21/21658 200/61.54 |
| 2006/0057863 | A1 * | 3/2006 | Araki | B60R 16/027 439/15 |
| 2006/0175816 | A1 * | 8/2006 | Spencer | B60R 21/2037 280/731 |
| 2008/0142345 | A1 * | 6/2008 | Heite | B60R 16/027 200/61.54 |
| 2009/0079168 | A1 * | 3/2009 | Umemura | B60R 21/2035 280/728.2 |
| 2010/0219621 | A1 * | 9/2010 | Sasaki | B60Q 5/003 280/731 |
| 2011/0067981 | A1 * | 3/2011 | Kusama | B60Q 1/1469 200/61.54 |
| 2011/0204602 | A1 * | 8/2011 | James | B60R 21/203 280/728.2 |
| 2012/0080868 | A1 * | 4/2012 | Banno | B60R 21/2037 280/728.2 |
| 2012/0169032 | A1 | 7/2012 | Sasaki et al. | |
| 2013/0015645 | A1 * | 1/2013 | Ullrey | B60Q 5/003 280/731 |
| 2013/0069350 | A1 * | 3/2013 | Umemura | F16F 7/1028 280/731 |
| 2013/0076011 | A1 * | 3/2013 | Umemura | B60Q 5/003 280/728.2 |
| 2013/0221641 | A1 * | 8/2013 | Kondo | B60R 21/2035 280/731 |
| 2014/0011374 | A1 * | 1/2014 | Adachi | H01R 35/025 439/13 |
| 2014/0070520 | A1 * | 3/2014 | James | B60Q 5/003 280/728.2 |
| 2014/0131982 | A1 * | 5/2014 | Ishii | B60R 21/2037 280/728.2 |
| 2015/0251621 | A1 * | 9/2015 | Siddharthan | B60R 21/2037 280/731 |
| 2015/0258953 | A1 * | 9/2015 | Murray, Jr. | G01D 11/245 73/493 |
| 2015/0266442 | A1 * | 9/2015 | Saito | B60R 21/2037 280/728.2 |
| 2016/0023677 | A1 * | 1/2016 | Sakurai | B62D 1/046 74/552 |
| 2016/0114752 | A1 * | 4/2016 | Ban No | B60R 21/2165 280/728.2 |
| 2017/0361801 | A1 * | 12/2017 | Ban No | B60R 21/2037 |
| 2018/0111580 | A1 * | 4/2018 | Sella | B62D 7/222 |
| 2019/0225178 | A1 * | 7/2019 | Kolosick | B60R 21/203 |
| 2019/0373728 | A1 * | 12/2019 | Hengel | B62D 1/046 |

FOREIGN PATENT DOCUMENTS

| | | |
|---|---|---|
| JP | H10-100926 A | 4/1998 |
| JP | H10-241504 A | 9/1998 |
| JP | 2001-097167 A | 4/2001 |
| JP | 2006-331803 A | 12/2006 |
| JP | 2008-056093 A | 3/2008 |
| JP | 2010-201949 A | 9/2010 |
| WO | 2012/032860 A1 | 3/2012 |

OTHER PUBLICATIONS

Office action dated Aug. 11, 2020 issued in corresponding JP patent application No. 2017-155994 (and English translation).

* cited by examiner

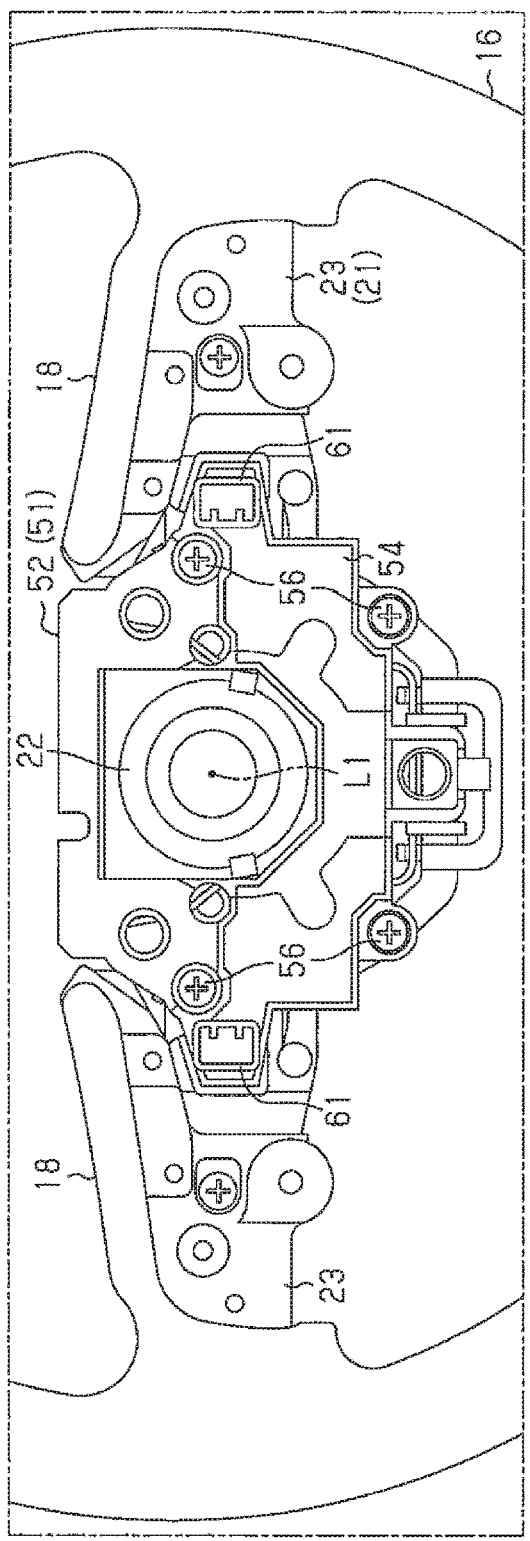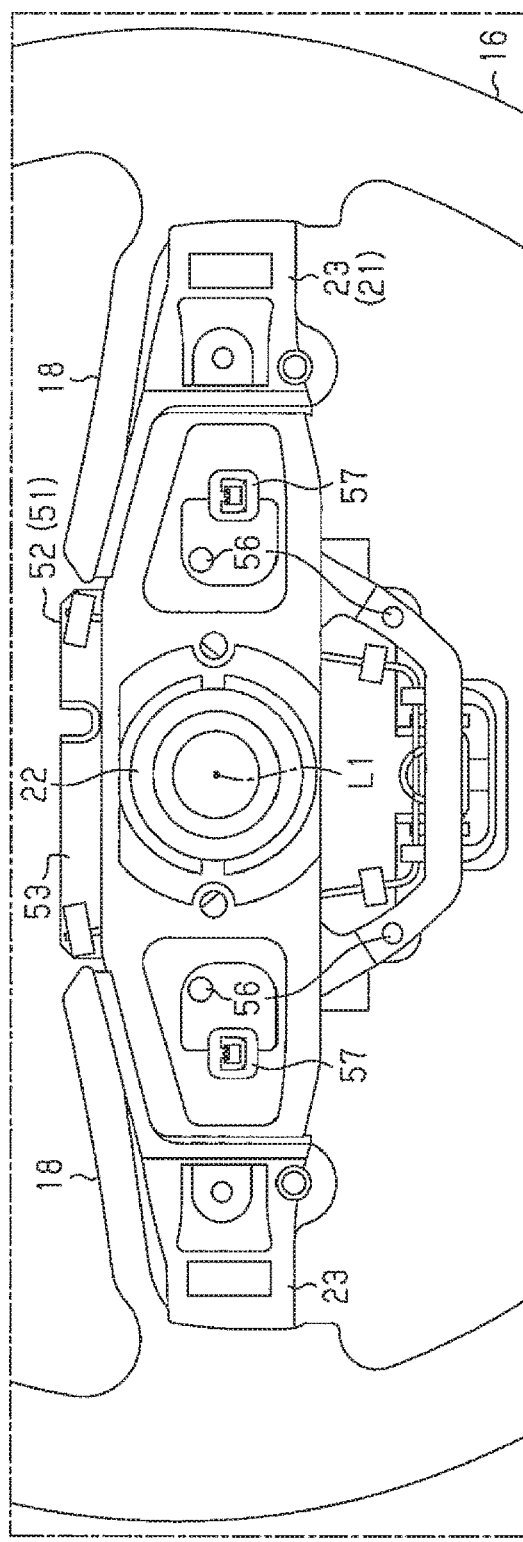

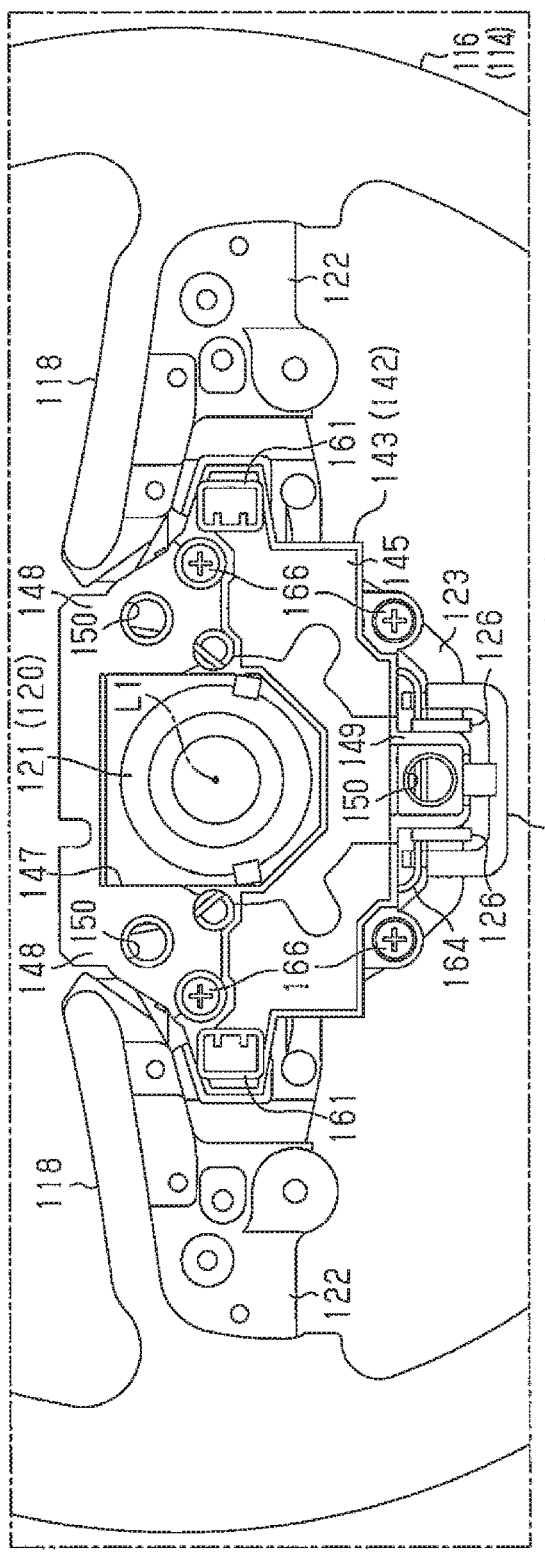
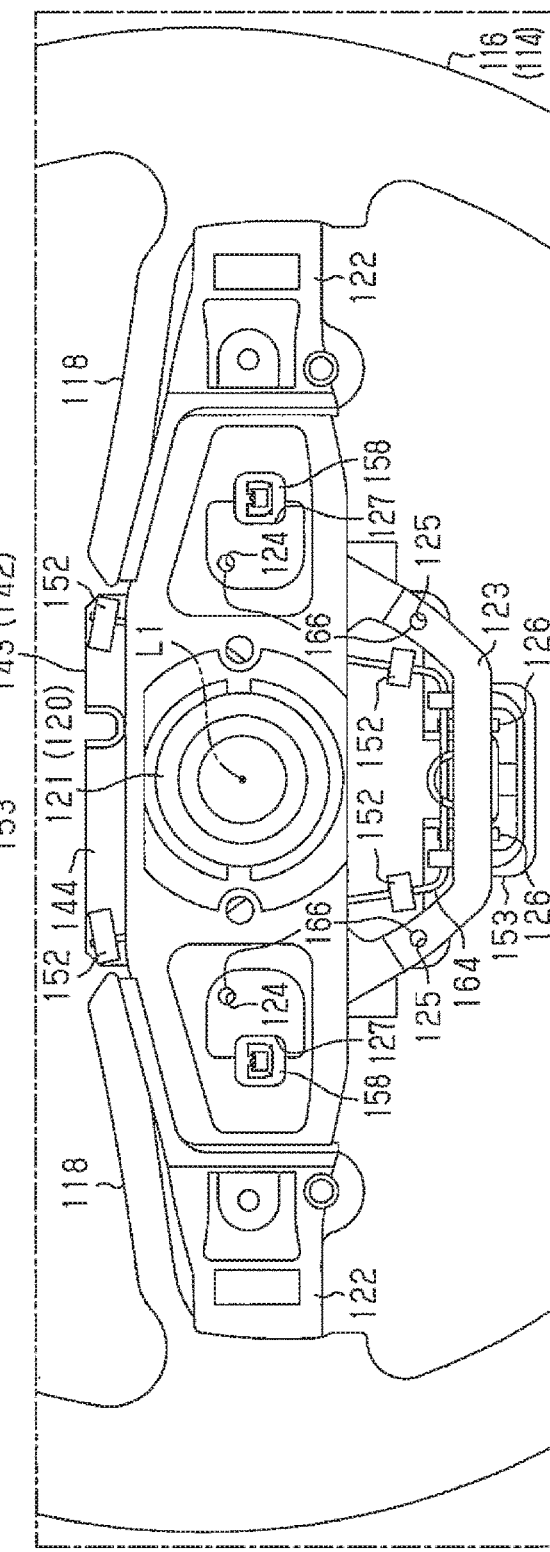

STEERING WHEEL

BACKGROUND

The present invention relates to a steering wheel that is turned to change the direction in forward traveling or rearward traveling of a vehicle.

Vehicle steering wheels that incorporate functional devices and a control device, which are electrically connected to each other, have been proposed as an embodiment of a vehicle steering wheel (for example, refer to Japanese Laid-Open Patent Publication No. 2008-56093). The functional devices include various switches operated by the driver to activate vehicle-mounted equipment such as a horn device, audio equipment, and an air-conditioner. The functional devices further include, for example, an airbag apparatus for protecting the driver from an impact if the impact is applied to the vehicle from the front.

The electrical connection between the functional devices and the control device is established with flexible wire harnesses. That is, connectors that are connected to the functional devices via the harnesses are coupled to connectors that are connected to the control device, so that the functional devices are electrically connected to the control device.

However, in the conventional steering wheel, in order to electrically connect the functional devices to the control device, the connector of each harness extending from the associated functional device needs to be coupled to the corresponding connector connected to the control device while having the harness being deformed. The coupling of the connectors is cumbersome.

In particular, an increasing number of functional devices have been incorporated in the steering wheels in recent years. In this respect, in the conventional steering wheel, the number of the harnesses is increased as the number of the incorporated functional devices is increased. This increases the processes for connecting the harnesses to the control device, and thus lowers the efficiency of the connection.

SUMMARY

Accordingly, it is an objective of the present invention to provide a steering wheel that facilitates the connection of functional devices to a control device.

To achieve the foregoing objective, a steering wheel is provided that includes a functional device and a control device, which is electrically connected to the functional device. The functional device includes a functional case, which constitutes a housing of the functional device. The control device includes a control case, which constitutes a housing of the control device. A first connector is partially exposed to an outside of the functional case. A second connector is partially exposed to an outside of the control case. The first connector is coupled to the second connector, so that the functional device is electrically connected to the control device without a harness between the functional case and the control case.

BRIEF DESCRIPTION OF THE DRAWINGS

FIG. 3A is a partial front view of the steering wheel before front functional devices and rear functional devices are connected to the control device according to the first embodiment.

FIG. 3B is a partial rear view illustrating the steering wheel before the front functional devices and the rear functional devices are connected to the control device according to the first embodiment.

FIG. 10A is a partial front view of the steering wheel before front functional devices and rear functional devices are connected to the control device according to the second embodiment.

FIG. 10B is a partial rear view of the steering wheel illustrating a state before the front functional devices and the rear functional devices are connected to the control device according to the second embodiment.

DESCRIPTION OF THE PREFERRED EMBODIMENTS

First Embodiment

A steering wheel according to a first embodiment will now be described with reference to FIGS. 1 to 4.

Figure 1:
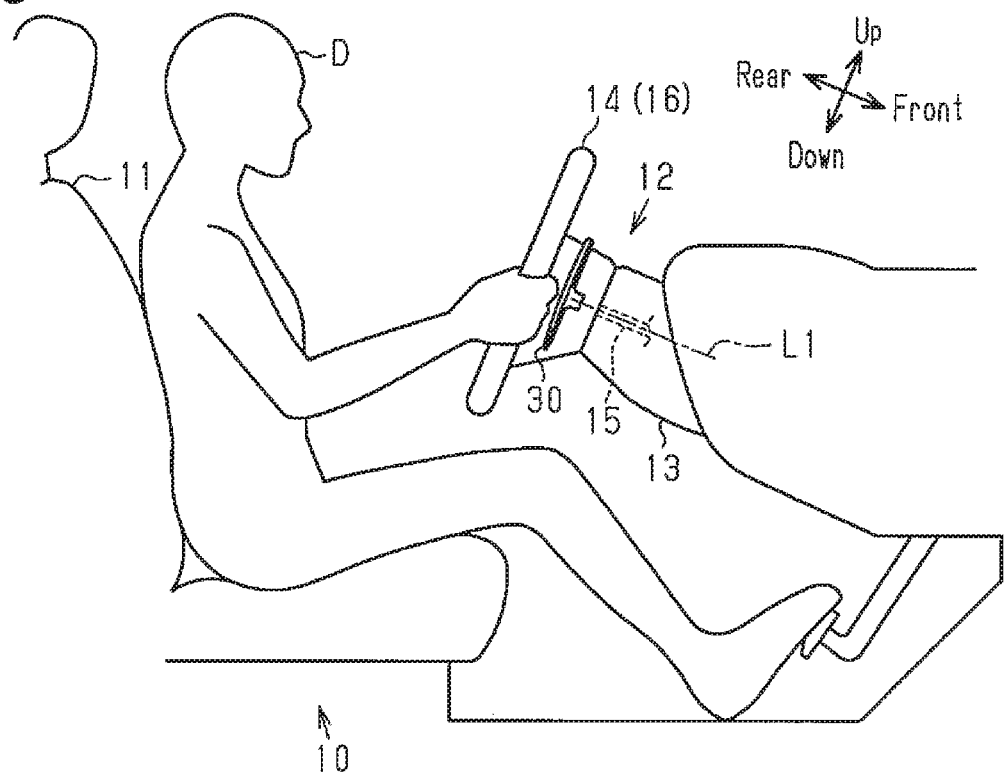
FIG. 1 is a schematic side view of a first embodiment, illustrating a steering wheel and the surrounding structure inside the vehicle.

As shown in FIG. 1, a steering apparatus 12 is provided in front of a driver's seat 11 in a vehicle 10. The steering apparatus 12 is operated by the driver D to steer the vehicle 10. The steering apparatus 12 includes a steering column 13 and a steering wheel 14, which is located on the rear end of the steering column 13 to be rotational. A steering shaft 15 is located in the steering column 13. The steering shaft 15 transmits rotation of the steering wheel 14 to a steering gear box (not shown). The steering shaft 15 is inclined so as to be higher toward the rear end.

In the first embodiment, the axis L1 of the steering shaft 15 is used as a reference when describing each part of the steering wheel 14. The direction along the axis L1 will be referred to as a front-rear direction of the steering wheel 14. Among directions along the plane perpendicular to the axis L1, the direction in which the steering wheel 14 is erected will be referred to as an up-down direction. Therefore, the front-rear direction and the up-down direction of the steering wheel 14 are slightly inclined relative to the front-rear direction (horizontal direction) and the up-down direction (vertical direction) of the vehicle 10.

Figure 2:
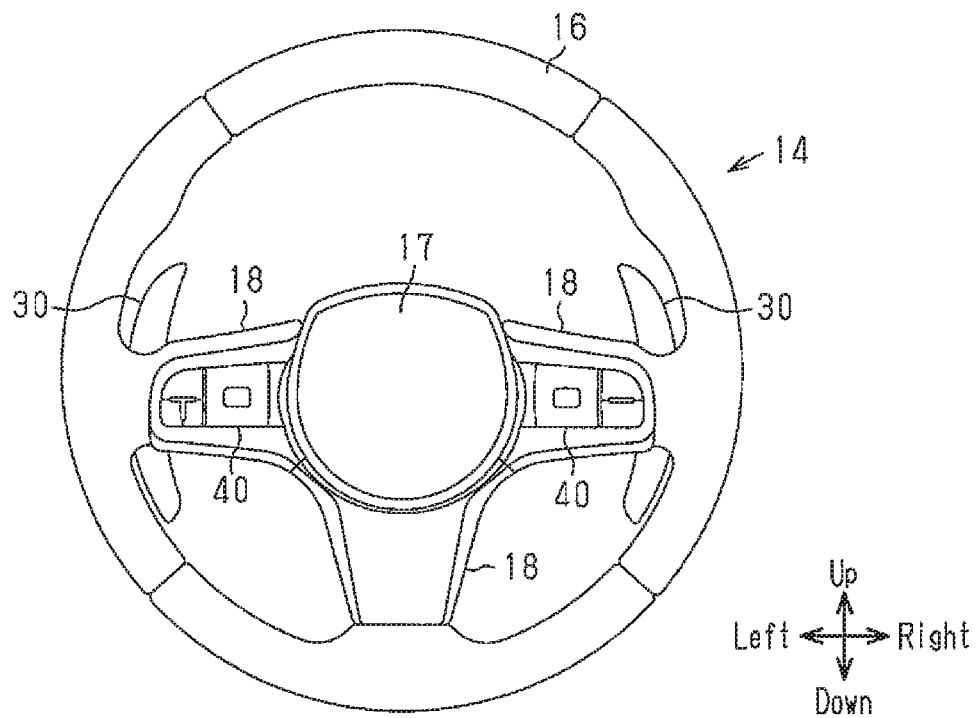
FIG. 2 is a front view of the steering wheel according to the first embodiment.

As shown in FIG. 2, the steering wheel 14 includes a ring portion (also referred to as a rim portion) 16, a pad portion 17, and spokes 18. The ring portion 16 is a section grasped and turned by the driver D and is substantially annular. The pad portion 17 is located in a space surrounded by the ring portion 16. The spokes 18 are provided between the ring portion 16 and the pad portion 17.

The framework of the steering wheel 14 is configured by a metal core 21 shown in FIGS. 3A and 3B. The metal core 21 includes an annular ring constituting section (not shown), a boss constituting section 22, which is located at the central portion of the ring constituting section, and spoke constituting sections 23, which couple the ring constituting section and the boss constituting section 22 with each other. The boss constituting section 22 is mounted on the rear end portion of the steering shaft 15 to be rotational integrally with the steering shaft 15.

Figure 4:
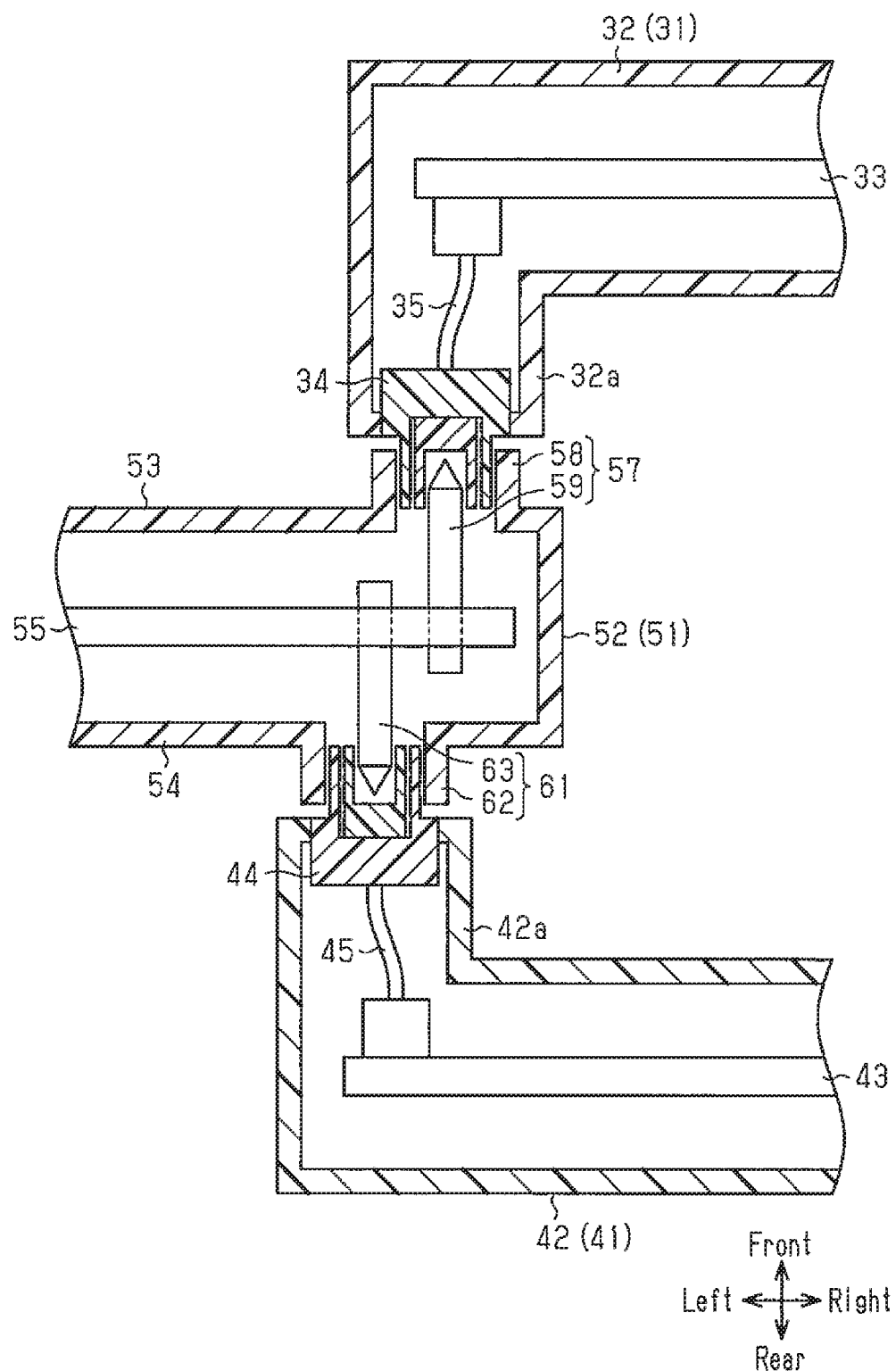
FIG. 4 is a partial cross-sectional plan view illustrating the relationship between the control device and the front and rear functional devices connected to the control device according to the first embodiment.

As shown in FIGS. 3A, 3B, and 4, the steering wheel 14 incorporates a control device 51 and multiple functional devices. The functional devices are electrically connected to the control device 51. The functional devices include, for example, various switches manipulated by the driver D to activate vehicle-mounted equipment such as a horn device, audio equipment, and an air-conditioner. The functional devices also include, for example, an airbag apparatus for protecting the driver D from an impact if the impact is applied to the vehicle from the front.

In the first embodiment, the functional devices include a pair of left and right front functional devices 31, which are arranged forward of a front wall 53 of the control device 51, which will be discussed below, and a pair of left and right rear functional devices 41, which are arranged rearward of a rear wall 54 of the control device 51, which will be discussed below.

The front functional devices 31 are located in the vicinity of the front of the coupling portions between the left and right spokes 18 and the ring portion 16. Each front functional device 31 includes a plastic front functional case 32, which constitutes the housing of the front functional device 31, and a functional substrate 33. Functional parts such as a paddle switch for gear shift instruction are mounted on the functional substrate 33. FIGS. 1 and 2 illustrate manipulation portions 30, which are connected to the paddle switches and manipulated to change the state of the switches. Each front functional case 32 is mounted on the metal core 21 in a state in which the front functional case 32 is positioned with respect to the metal core 21 by a non-illustrated positioning portion. Each front functional case 32 includes a projection 32a, which projects rearward. The projection 32a receives a front first connector 34. The rear portion of the front first connector 34 is exposed to the rear from the projection 32a.

Furthermore, each front functional case 32 accommodates a stress absorbing portion, which absorbs the stress transmitted from the functional substrate 33 to the front first connector 34. The stress absorbing portion is constituted by a harness 35, which in a slack state electrically connects the functional substrate 33 to the front first connector 34 inside the front functional case 32.

Each rear functional device 41 is constituted by a steering switch module located on the corresponding spoke 18. Each rear functional device 41 includes a plastic rear functional case 42, which constitutes the housing of the rear functional device 41, and a functional substrate 43. Functional parts, such as a cruise control switch, an audio switch, and a temperature setting switch of an air-conditioner, are mounted on the functional substrate 43. FIG. 2 illustrates manipulation portions 40, which are connected to various switches and are manipulated to change the state of the switches. Each rear functional case 42 is mounted on the metal core 21 in a state in which the rear functional case 42 is positioned with respect to the metal core 21 by a non-illustrated positioning portion. Each rear functional case 42 includes a projection 42a, which projects forward. The projection 42a receives a rear first connector 44. The front portion of the rear first connector 44 is exposed to the front of the projection 42a.

Furthermore, each rear functional case 42 accommodates a stress absorbing portion, which absorbs the stress transmitted from the functional substrate 43 to the rear first connector 44. The stress absorbing portion is constituted by a harness 45, which in a slack state electrically connects the functional substrate 43 to the rear first connector 44 inside the rear functional case 42.

As shown in FIGS. 3A, 3B, and 4, the control device 51 includes a plastic control case 52, which constitutes the housing of the control device 51, and a control substrate 55. Control parts are mounted on the control substrate 55. The control case 52 includes the front wall 53 and the rear wall 54, which face each other in the front-rear direction. The front wall 53 is located in the vicinity of the rear of the front functional devices 31, and the rear wall 54 is located in the vicinity of the front of the rear functional devices 41. The control substrate 55 is located between the front wall 53 and the rear wall 54. The control case 52 is positioned with respect to the metal core 21 by a non-illustrated positioning portion. In this state, the control case 52 is mounted on the metal core 21 with fasteners 56 such as screws.

A pair of left and right front second connectors 57 and a pair of left and right rear second connectors 61 are provided on the control device 51. Each front second connector 57 includes a section to which the corresponding front first connector 34 is coupled on the front wall 53. That is, each front second connector 57 includes a front connector housing 58 and a front pin 59. The front connector housing 58 of each front second connector 57 projects forward from the front wall 53 with the inside of the control case 52 communicating with the outside of the control case 52 and is formed integrally with the front wall 53. The front pin 59 of each front second connector 57 extends through the control substrate 55 and projects toward the front connector housing 58.

Each rear second connector 61 includes a section to which the corresponding rear first connector 44 is coupled on the rear wall 54. The rear second connectors 61 are located behind the front second connectors 57. That is, each rear second connector 61 includes a rear connector housing 62 and a rear pin 63. The rear connector housing 62 of each rear second connector 61 projects rearward from the rear wall 54 with the inside of the control case 52 communicating with the outside of the control case 52 and is formed integrally with the rear wall 54. The rear pin 63 of each rear second connector 61 extends through the control substrate 55 at a section adjacent to the front pin 59 in a direction along the surface of the control substrate 55 (left-right direction in FIG. 4) and projects toward the rear connector housing 62.

The front pins 59 and the rear pins 63 are typically press-fit pins. FIG. 4 illustrates one of the front pins 59 and one of the rear pins 63, which are arranged in a direction orthogonal to the sheet of the drawing.

Operation and advantages of the steering wheel 14 according to the first embodiment configured as described above will now be described.

Operation and advantages of the connecting process will be described below.

The front functional devices 31 and the rear functional devices 41 are connected to the control device 51 as follows.

Each front first connector 34 is coupled to the front connector housing 58 and the front pin 59 of the corresponding front second connector 57 from the front of the front wall 53 of the control case 52. This electrically connects each front functional device 31 to the control device 51 without the harness between the front functional case 32 and the control case 52.

Additionally, each rear first connector 44 is coupled to the rear connector housing 62 and the rear pin 63 of the corresponding rear second connector 61 from the rear of the rear wall 54 of the control case 52. This electrically connects each rear functional device 41 to the control device 51 without the harness between the rear functional case 42 and the control case 52.

Part (the rear portion) of each front first connector 34 is exposed to the outside of the front functional case 32. Part (the front portion) of each rear first connector 44 is exposed to the outside of the rear functional case 42. Part of each front second connector 57 and part of each rear second connector 61 are exposed to the outside of the control case 52.

Thus, unlike the conventional steering wheel, it is unnecessary to couple each front first connector 34 to the corresponding front second connector 57 while having the harness being deformed. It is only required to bring each front functional device 31 close to the control device 51 from the front and couple each front first connector 34 to the corresponding front second connector 57. As a result, the connection of each front functional device 31 to the control device 51 is facilitated.

Additionally, unlike the conventional steering wheel, it is unnecessary to couple each rear first connector 44 to the corresponding rear second connector 61 while having the harness being deformed. It is only required to bring each rear functional device 41 close to the control device 51 from the rear and couple each rear first connector 44 to the corresponding rear second connector 61. As a result, the connection of each rear functional device 41 to the control device 51 is facilitated.

Operation and advantages related to reducing the mounting space will be described below.

As described above, the front functional devices 31 and the rear functional devices 41 are connected to the control device 51 from the front and the rear. Furthermore, the rear second connectors 61 are located behind the front second connectors 57.

For this reason, the dimension of the space required for connecting the front functional devices 31 and the rear functional devices 41 to the control device 51 in the direction along the surface of the control substrate 55 (left-right direction in FIG. 4) is less than the dimension in the same direction when the front second connectors 57 and the rear second connectors 61 are provided on the same side in the thickness direction (the front side or the rear side) of the control substrate 55. Thus, the space required for the connection in the direction along the surface of the control substrate 55 is reduced.

If the front connector housings 58 and the rear connector housings 62 are provided on the control substrate 55 instead of the control case 52, securing means such as soldering will be necessary. The front connector housings 58 are secured to the front surface of the control substrate 55, and the rear connector housings 62 are secured to the rear surface of the control substrate 55. The dimension of the space required for connecting the front functional devices 31 and the rear functional devices 41 to the control device 51 in the direction along the surface of the control substrate 55 (left-right direction in FIG. 4) is increased by the amount corresponding to the dimension of the securing means.

In this respect, in the first embodiment, the front connector housings 58 are integrally formed with the front wall 53, and the rear connector housings 62 are integrally formed with the rear wall 54. Thus, the front connector housings 58 do not need to be secured to the front wall 53. Furthermore, the rear connector housings 62 do not need to be secured to the rear wall 54. Thus, the securing means is unnecessary. The dimension of the space required for connecting the front functional devices 31 and the rear functional devices 41 to the control device 51 in the direction along the surface of the control substrate 55 (left-right direction in FIG. 4) is reduced by the amount corresponding to the dimension of the securing means that is unnecessary.

Operation and advantages in providing input to the front functional devices 31 and the rear functional devices 41 will be described below.

In each front functional device 31, the functional substrate 33 is electrically connected to the front first connector 34 with the harness 35. In each rear functional device 41, the functional substrate 43 is electrically connected to the rear first connector 44 with the harness 45.

Furthermore, each front functional device 31 is electrically connected to the control device 51 by coupling the front first connector 34 to the corresponding front second connector 57. Each rear functional device 41 is electrically connected to the control device 51 by coupling the rear first connector 44 to the corresponding rear second connector 61.

If the driver provides input to any of the front functional devices 31 and the rear functional devices 41 through the manipulation portions 30, 40 while grasping the ring portion 16, the control device 51 controls the corresponding vehicle-mounted equipment. The vehicle-mounted equipment is activated in a manner corresponding to the input. That is, the input for activating the vehicle-mounted equipment is provided at hand.

Operation and advantages of stress absorption will be described below.

When there is input to each front functional device 31 through the corresponding manipulation portion 30, when there is variation in the dimensions of the components of the front functional devices 31, or when the steering wheel 14 is turned, stress may be transmitted from each functional substrate 33 to the corresponding front first connector 34.

In this respect, in the first embodiment, the stress absorbing portion is provided in each front functional case 32. Some of the stress is absorbed by the stress absorbing portion before being transmitted from the functional substrate 33 to the front first connector 34. That is, since the harness 35, which connects the functional substrate 33 to the front first connector 34, is slack, when the stress is applied from the functional substrate 33, the harness 35 is deformed to absorb some of the stress. The stress transmitted from the functional substrate 33 to the front first connector 34 is reduced by the amount of the stress absorbed by the harness 35. This reliably maintains the state in which the functional substrate 33 is electrically connected to the front first connector 34.

When there is input to each rear functional device 41 through the corresponding manipulation portion 40, when there is variation in the dimensions of the components of the rear functional devices 41, or when the steering wheel 14 is turned, similarly, stress may be transmitted from each functional substrate 43 to the corresponding rear first connector 44.

In this respect, in the first embodiment, the stress absorbing portion is provided in each rear functional case 42. Some of the stress is absorbed by the stress absorbing portion before being transmitted from the functional substrate 43 to the rear first connector 44. That is, since the harness 45, which connects the functional substrate 43 to the rear first connector 44, is slack, when the stress is applied from the functional substrate 43, the harness 45 is deformed to absorb some of the stress. The stress transmitted to the rear first connector 44 is reduced by the amount of the stress absorbed by the harness 45. This reliably maintains the state in which the functional substrate 43 is electrically connected to the rear first connector 44.

The first embodiment may be modified as follows.

Figure 5:
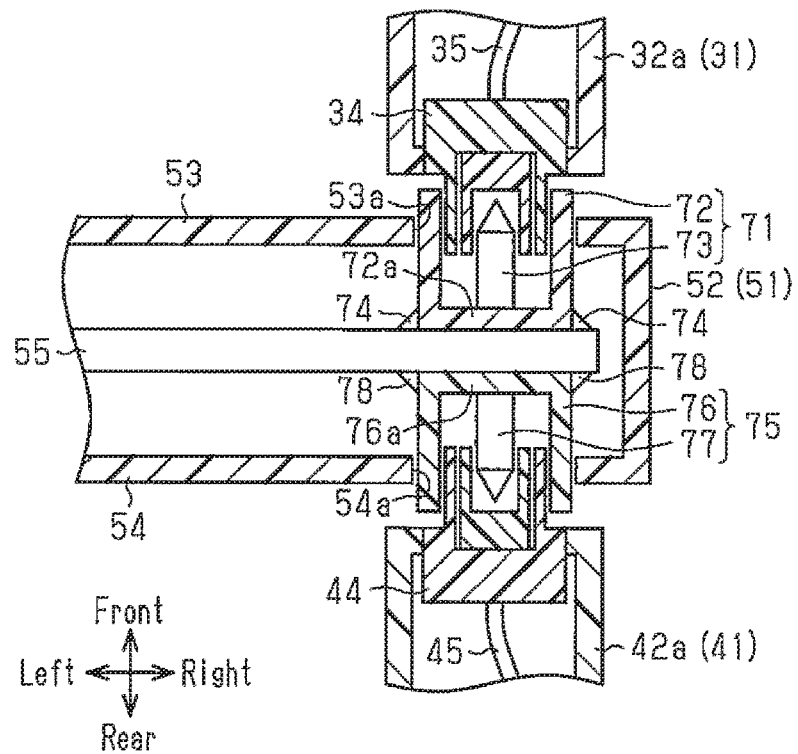
FIG. 5 is a partial cross-sectional plan view illustrating the relationship between the control device and the front and rear functional devices connected to the control device according to a modification.

As shown in FIG. 5, a front second connector 71 may be secured to the front surface of the control substrate 55 in the control device 51. A rear second connector 75 may be secured to the rear surface of the control substrate 55.

The front second connector 71 includes a front connector housing 72, which has an open front end, and a front pin 73, which projects forward from a bottom 72a of the front connector housing 72. The front connector housing 72 is secured to the control substrate 55 by securing means such as soldering. FIG. 5 illustrates securing sections 74 formed by soldering. The front portion of the front second connector 71 is inserted in a hole 53a in the front wall 53 and is exposed forward of the front wall 53. The front first connector 34 is coupled to the front second connector 71 from the front.

The rear second connector 75 includes a rear connector housing 76, which has an open rear end, and a rear pin 77, which projects rearward from a bottom 76a of the rear connector housing 76. The rear connector housing 76 is secured to the control substrate 55 by securing means such as soldering. FIG. 5 illustrates securing sections 78 formed by soldering. The rear portion of the rear second connector 75 is inserted in a hole 54a in the rear wall 54 and is exposed rearward of the rear wall 54. The rear first connector 44 is coupled to the rear second connector 75 from the rear.

In FIG. 5, like or the same reference numerals are given to those components that are like or the same as the corresponding components of the first embodiment.

The modification also operates in the same manner as and achieves the same advantages as the first embodiment. Additionally, the combination of the front first connector 34 and the front second connector 71 and the combination of the rear first connector 44 and the rear second connector 75 may be located at the same position in the direction along the surface of the control substrate 55 (left-right direction in FIG. 5), in other words, at positions opposed to each other in the front-rear direction.

Figure 6:
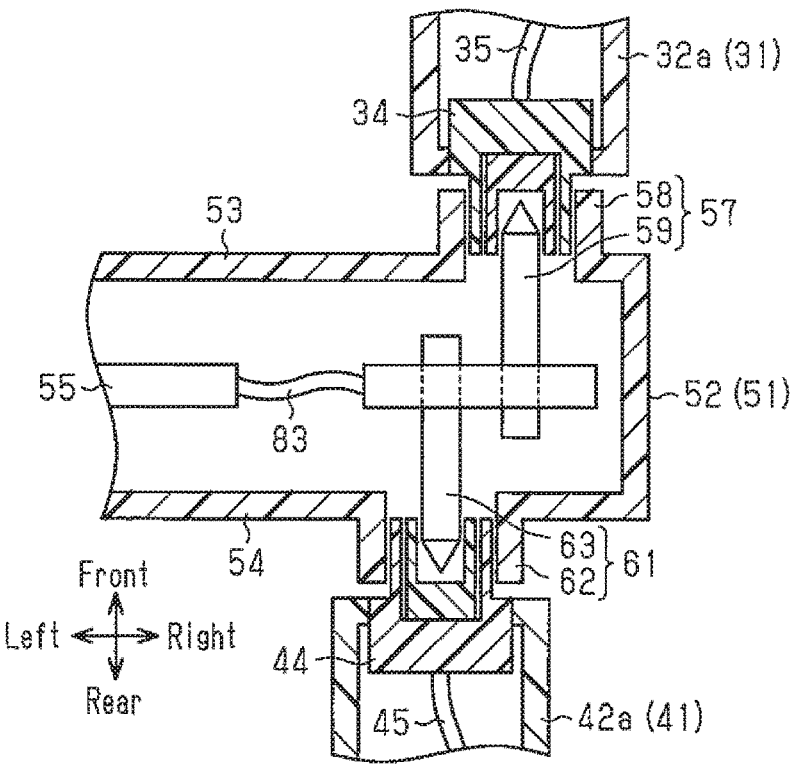
FIG. 6 is a partial cross-sectional plan view illustrating the relationship between the control device and the front and rear functional devices connected to the control device according to a modification.

As shown in FIG. 6, the stress absorbing portion that absorbs the stress transmitted from the control substrate 55 to the front second connector 57 and the rear second connector 61 may be provided inside the control case 52. The stress absorbing portion is configured by a harness 83, which in a slack state electrically connects the control substrate 55 to the front second connector 57 and the rear second connector 61 in the control case 52.

In FIG. 6, like or the same reference numerals are given to those components that are like or the same as the corresponding components of the first embodiment.

When the stress is applied from the control substrate 55 to the harness 83 by variation in the dimensions of the components of the control device 51, or when the steering wheel 14 is turned, the harness 83 is deformed to absorb some of the stress. The stress transmitted from the control substrate 55 to the front second connector 57 and the rear second connector 61 is reduced by the amount of the stress absorbed by the harness 83. This reliably maintains the state in which the control substrate 55 is electrically connected to the front second connector 57 and the rear second connector 61.

The front functional devices 31 and the control device 51 are mounted on the metal core 21 in a state in which the front functional devices 31 and the control device 51 are positioned with respect to sections different from each other. The relative position between each front first connector 34 and the corresponding front second connector 57 may be displaced due to variation in the mounting positions. If the positional displacement amount is increased, the coupling of each front first connector 34 to the corresponding front second connector 57 may be hindered. For this reason, one of the front first connector 34 and the front second connector 57 may be movable in a direction along the surface of the control substrate 55. Such a configuration absorbs the positional variation and enables each front first connector 34 to be coupled to the corresponding front second connector 57.

The rear functional devices 41 and the control device 51 are mounted on the metal core 21 in a state in which the rear functional devices 41 and the control device 51 are positioned with respect to sections different from each other. The relative position between each rear first connector 44 and the corresponding rear second connector 61 may be displaced due to the variation in the mounting positions. If the positional displacement amount is increased, the coupling of each rear first connector 44 to the corresponding rear second connector 61 may be hindered. For this reason, similarly, one of the rear first connector 44 and the rear second connector 61 may be movable in a direction along the surface of the control substrate 55. Such a configuration absorbs the positional variation and enables each rear first connector 44 to be coupled to the corresponding rear second connector 61.

The vehicle-mounted equipment controlled to be activated by the control device 51 such as an airbag apparatus may be the functional device. The first connector of the functional device may be coupled to one of the second connectors of the control case 52, so that the functional device and the control device are electrically connected to each other.

The front second connectors 57, 71 and the rear second connectors 61, 75 may be provided on the same side in the thickness direction (the front side or the rear side) of the control substrate 55.

Second Embodiment

A steering wheel according to a second embodiment will now be described with reference to FIGS. 7 to 19.

Figure 7:
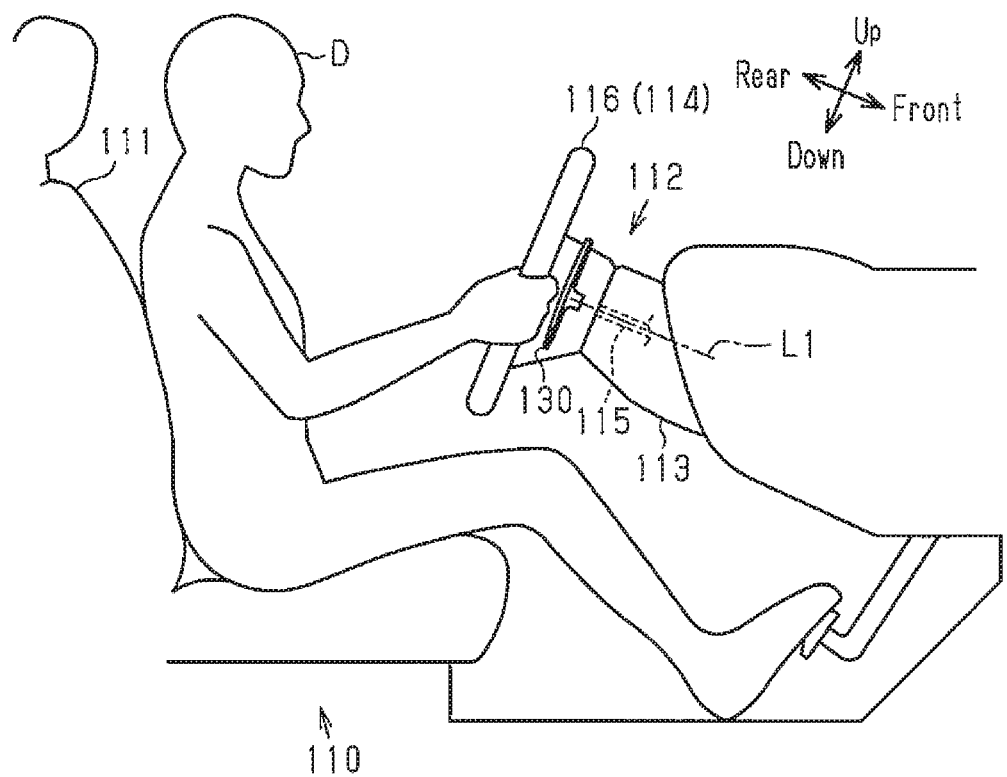
FIG. 7 is a schematic side view of a second embodiment, illustrating a steering wheel and the surrounding structure inside the vehicle.

As shown in FIG. 7, a steering apparatus 112 is provided in front of a driver's seat 111 in a vehicle 110. The steering apparatus 112 is operated by the driver D to steer the vehicle 110. The steering apparatus 112 includes a steering column 113 and a steering wheel 114, which is located on the rear end of the steering column 113 to be rotational. A steering shaft 115 is located in the steering column 113. The steering shaft 115 transmits rotation of the steering wheel 114 to a steering gear box (not shown). The steering shaft 115 is inclined so as to be higher toward the rear end.

Like the first embodiment, in the second embodiment, the axis L1 of the steering shaft 115 is used as a reference when describing each part of the steering wheel 114. The direction along the axis L1 will be referred to as a front-rear direction of the steering wheel 114. Among directions along the plane perpendicular to the axis L1, the direction in which the steering wheel 114 is erected will be referred to as an up-down direction. Therefore, the front-rear direction and the up-down direction of the steering wheel 114 are slightly inclined relative to the front-rear direction (horizontal direction) and the up-down direction (vertical direction) of the vehicle 110.

In FIGS. 11 to 15 and 17, for purposes of illustration, the front-rear direction of the steering wheel 114 coincides with the horizontal direction, and the up-down direction of the steering wheel 114 coincides with the vertical direction.

Figure 8:
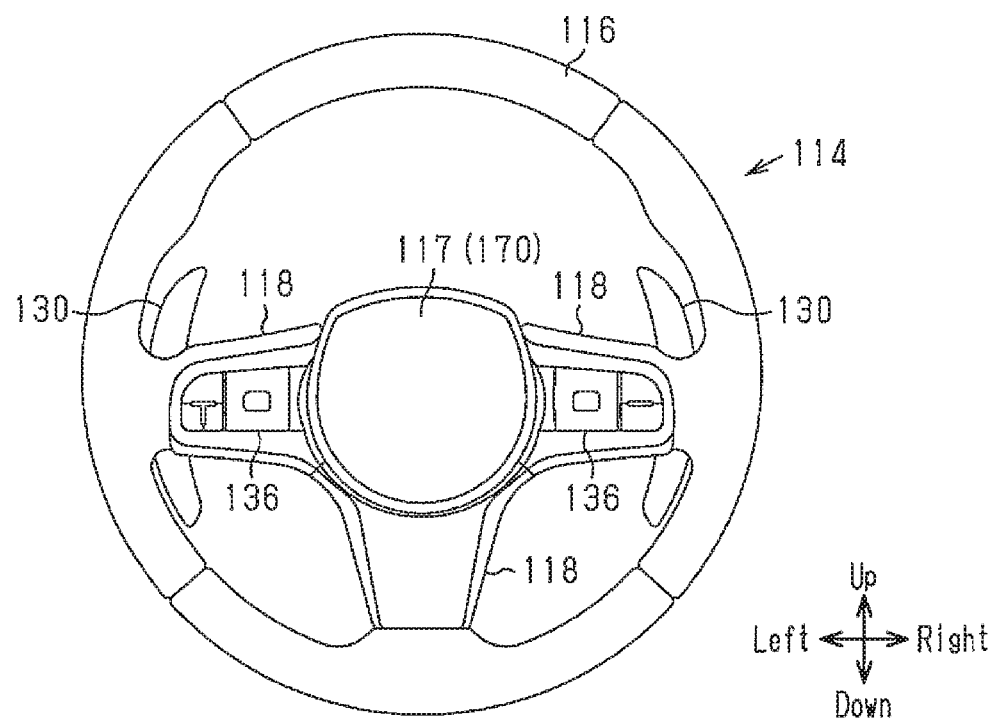
FIG. 8 is a front view of the steering wheel according to the second embodiment.

As shown in FIG. 8, the steering wheel 114 includes a ring portion (also referred to as a rim portion) 116, a pad portion 117, and spokes 118. The ring portion 116 is a section grasped and turned by the driver D and is substantially annular. The pad portion 117 is located in a space surrounded by the ring portion 116. The spokes 118 are provided between the ring portion 116 and the pad portion 117. The steering wheel 114 includes an airbag apparatus (airbag module) 170 in a space surrounded by the ring portion 116. The pad portion 117 constitutes part of the airbag apparatus 170.

Figure 9:
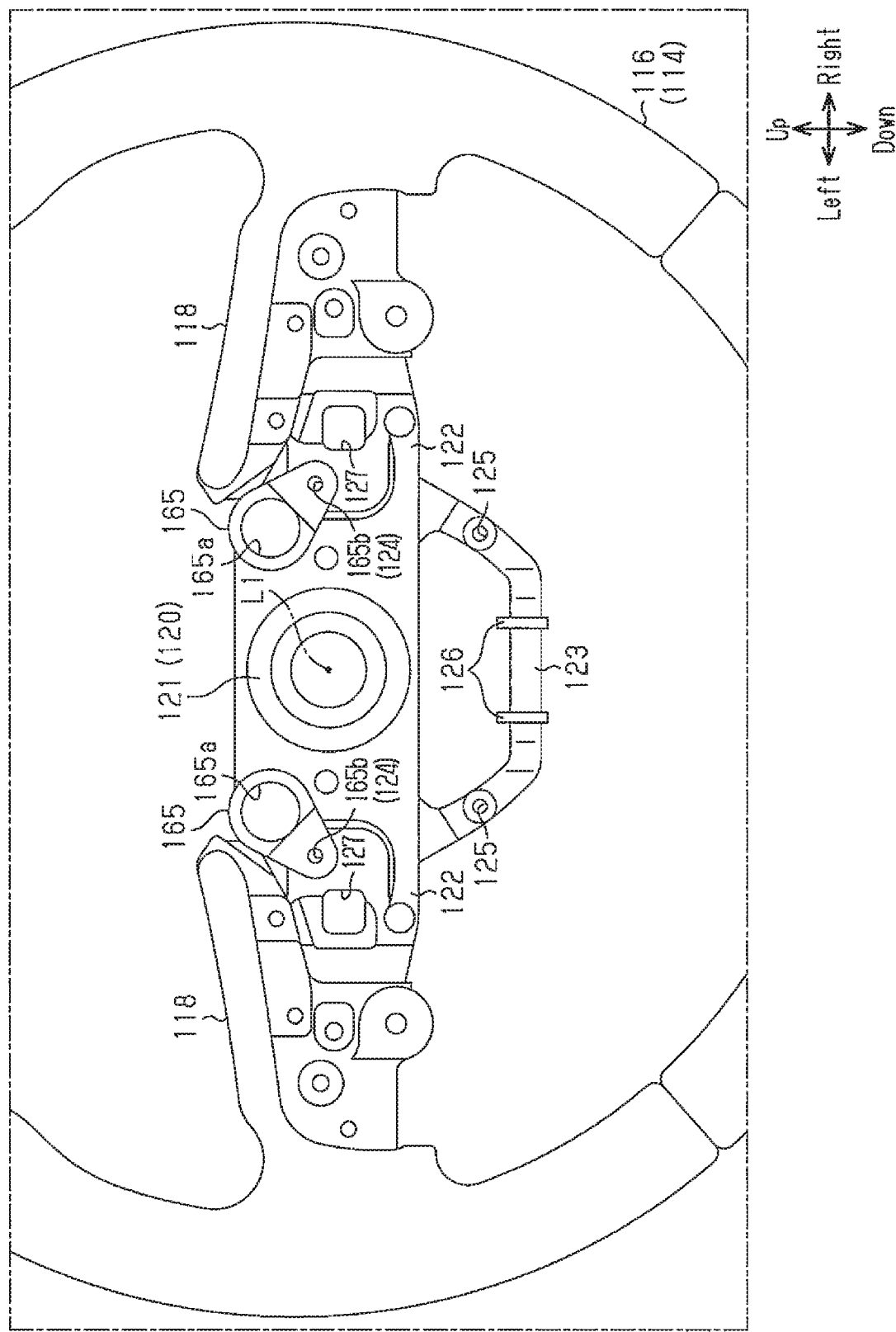
FIG. 9 is a partial front view of the second embodiment, illustrating a state before a control device, an airbag apparatus, and other components are assembled to a metal core.

The framework of the steering wheel 114 is configured by a metal core 120 shown in FIG. 9. The metal core 120 is made of iron, aluminum, magnesium, or an alloy of these elements and is grounded to the body (not shown) of the vehicle 110. The metal core 120 includes an annular ring constituting section (not shown), a boss constituting section 121, which is located substantially at the central portion of the space surrounded by the ring constituting section, a pair of spoke constituting sections 122, which couple the ring constituting section and the boss constituting section 121, and a coupling portion 123, which detours the boss constituting section 121 to couple the spoke constituting sections 122 with each other. The boss constituting section 121 is mounted on the rear end portion of the steering shaft 115 to be rotational integrally with the steering shaft 115. The spoke constituting sections 122 are aligned with each other.

Each spoke constituting section 122 includes a threaded bore 124 formed in the vicinity of the boss constituting section 121. The coupling portion 123 includes two threaded bores 125 each formed in the vicinity of one of the spoke constituting sections 122. Each spoke constituting section 122 includes a window 127, which is constituted by a hole. The window 127 is formed at a position between the corresponding threaded bore 124 and the ring portion 116. Furthermore, two restricting portions 126, which constitute part of the metal core 120, are integrally formed with the coupling portion 123 between the threaded bores 125. Part of each restricting portion 126 projects from the coupling portion 123 toward the boss constituting section 121.

Figure 16:
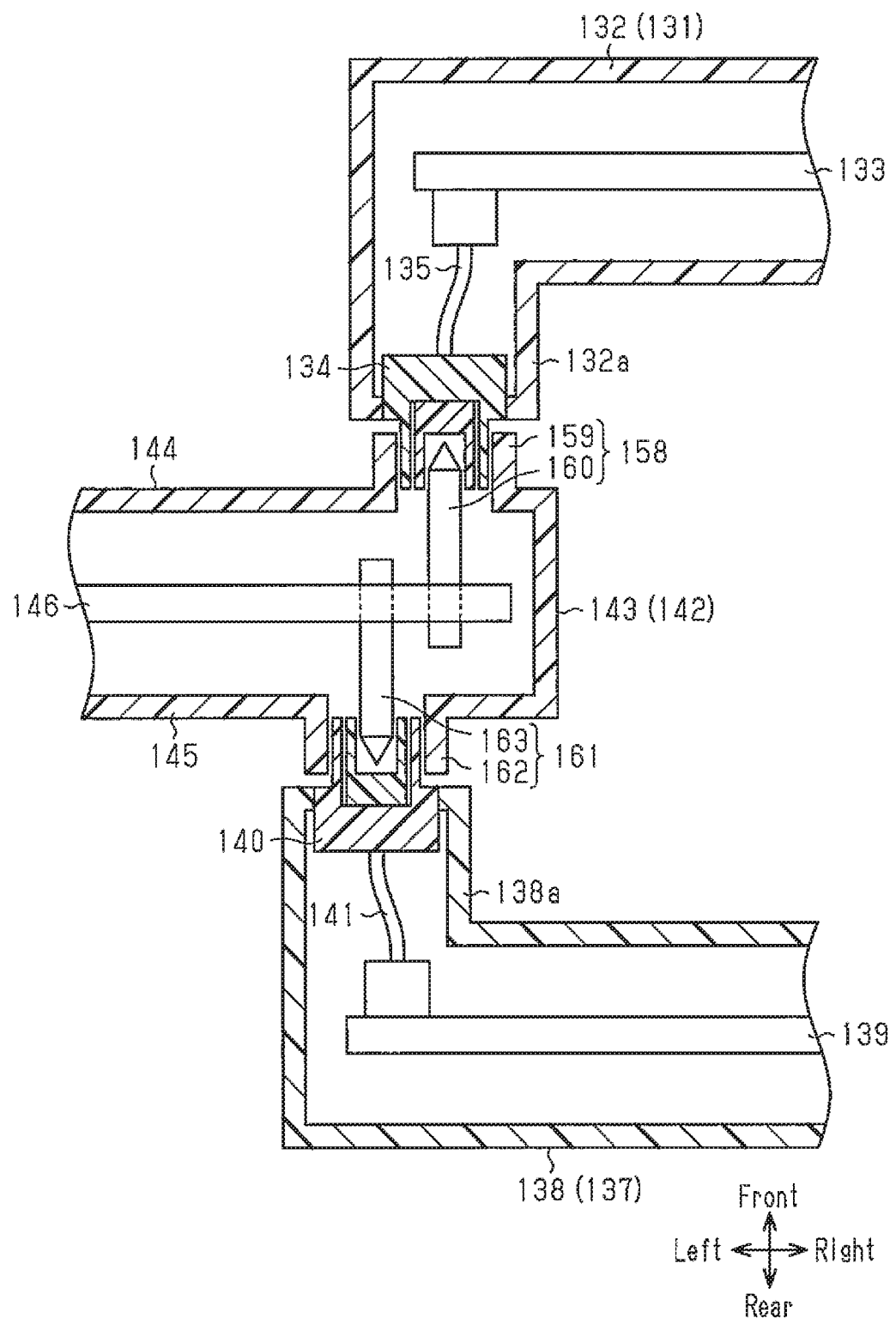
FIG. 16 is a partial cross-sectional plan view illustrating the relationship between the control device and the front and rear functional devices connected to the control device according to the second embodiment.

As shown in FIGS. 10A, 10B, and 16, a control device 142 and functional devices are mounted on the steering wheel 114. The functional devices are electrically connected to the control device 142. The functional devices include, for example, various switches manipulated by the driver D (refer to FIG. 7) to activate the vehicle-mounted equipment such as a horn device 167, audio equipment, and an air-conditioner. The functional devices also include the airbag apparatus 170.

In the second embodiment, the functional devices include a pair of front functional devices 131, which face each other on the front side of the control device 142 with the axis L1 located in between, and a pair of rear functional devices 137, which face each other on the rear side of the control device 142 with the axis L1 located in between in the longitudinal direction of the spoke constituting sections 122. FIG. 16 partially illustrates one of the front functional devices 131 and one of the rear functional devices 137. FIG. 16 illustrates only the main part and omits the surrounding member such as the metal core 120.

<Front Functional Devices 131>

The front functional devices 131 are located in the vicinity of the front of the coupling portions between the spokes 118 and the ring portion 116. Each front functional device 131 includes a plastic front functional case 132, which constitutes the housing of the front functional device 131, and a functional substrate 133. Functional parts such as a paddle switch for gear shift instruction are mounted on the functional substrate 133. FIGS. 7 and 8 illustrate manipulation portions 130, which are connected to the paddle switches and manipulated to change the state of the switches. Each front functional case 132 includes a projection 132a, which projects rearward. The projection 132a receives a front first connector 134. The rear portion of the front first connector 134 is exposed to the rear from the projection 132a.

Furthermore, each front functional case 132 accommodates a stress absorbing portion, which absorbs the stress transmitted from the functional substrate 133 to the front first connector 134. The stress absorbing portion is configured by a harness 135, which in a slack state electrically connects the functional substrate 133 to the front first connector 134 inside the front functional case 132.

Each front functional device 131 is mounted on the metal core 120 in a state in which the front first connector 134 is coupled to a front second connector 158 of the control device 142, which will be discussed below.

<Rear Functional Devices 137>

Each rear functional device 137 is configured by a steering switch module located on each spoke 118. Each rear functional device 137 includes a plastic rear functional case 138, which constitutes the housing of the rear functional device 137, and a functional substrate 139. Functional parts, such as a cruise control switch, an audio switch, and a temperature setting switch of an air-conditioner, are mounted on the functional substrate 139. FIG. 8 illustrates manipulation portions 136, which are connected to various switches and are manipulated to change the state of the switches. Each rear functional case 138 includes a projection 138a, which projects forward. The projection 138a receives a rear first connector 140. The front portion of the rear first connector 140 is exposed to the front of the projection 138a.

Furthermore, each rear functional case 138 accommodates a stress absorbing portion, which absorbs the stress transmitted from the functional substrate 139 to the rear first connector 140. The stress absorbing portion is constituted by a harness 141, which in a slack state electrically connects the functional substrate 139 to the rear first connector 140 inside the rear functional case 138.

Each rear functional device 137 is mounted on the metal core 120 in a state in which the rear first connector 140 is coupled to a rear second connector 161 of the control device 142, which will be discussed below.

<Control Device 142>

The control device 142 includes a plastic mounting member 143, which constitutes the housing of the control device 142, and a control substrate 146. Control parts are mounted on the control substrate 146. The mounting member 143 is located rearward of the central portion of the metal core 120. The central portion, in this case, corresponds to the boss constituting section 121, the section of each spoke constituting section 122 close to the boss constituting section 121, and the coupling portion 123. The mounting member 143 is used as the control case covering the control substrate 146 and includes a front wall 144 and a rear wall 145, which face each other in the front-rear direction. The front wall 144 is located in the vicinity of the rear of the front functional devices 131, and the rear wall 145 is located in the vicinity of the front of the rear functional devices 137. The control substrate 146 is located between the front wall 144 and the rear wall 145.

Figure 11:
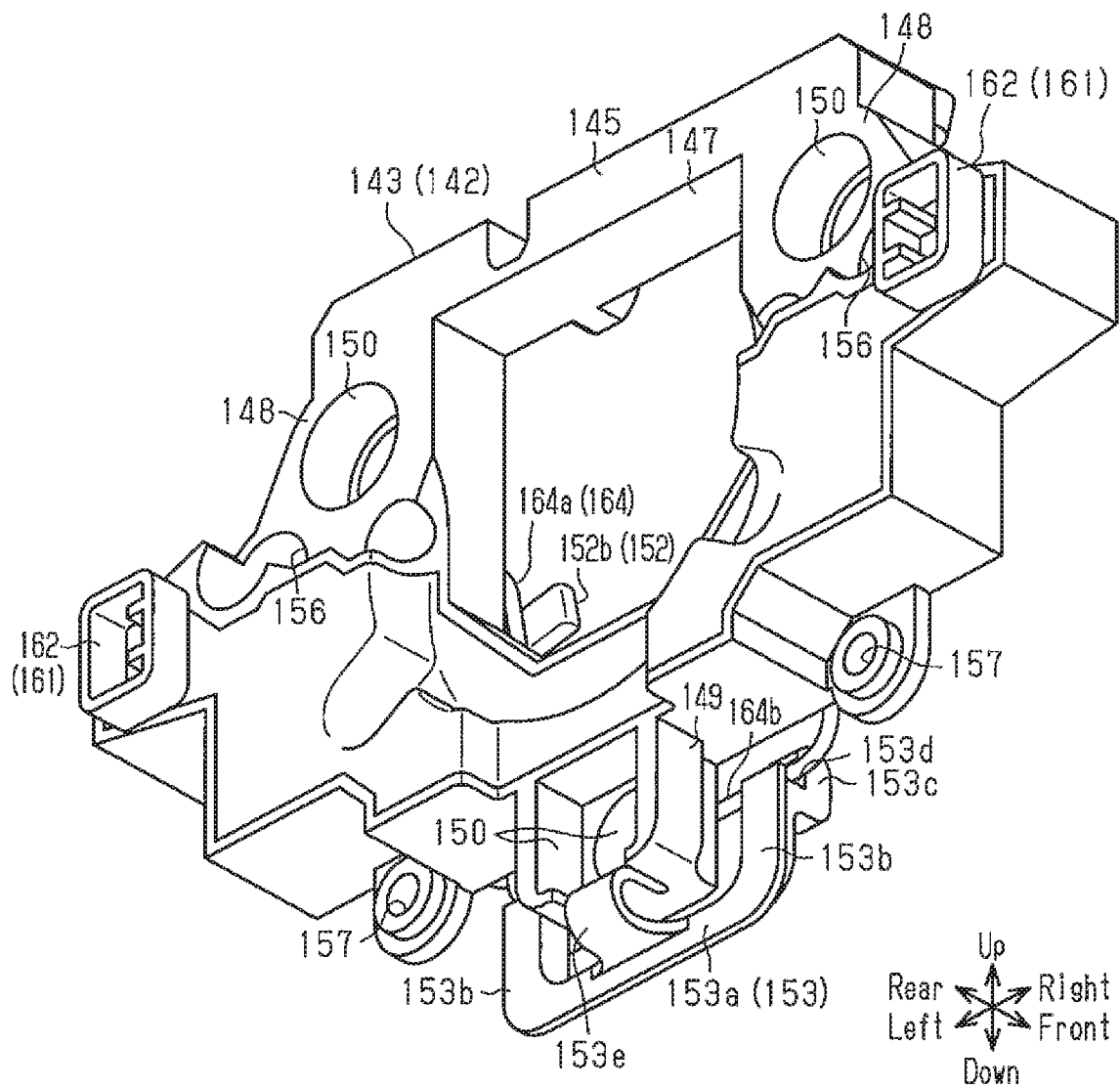
FIG. 11 is a perspective view of the control device as viewed from the rear of the vehicle in a state in which a snap spring is mounted on the mounting member according to the second embodiment.
Figure 12:
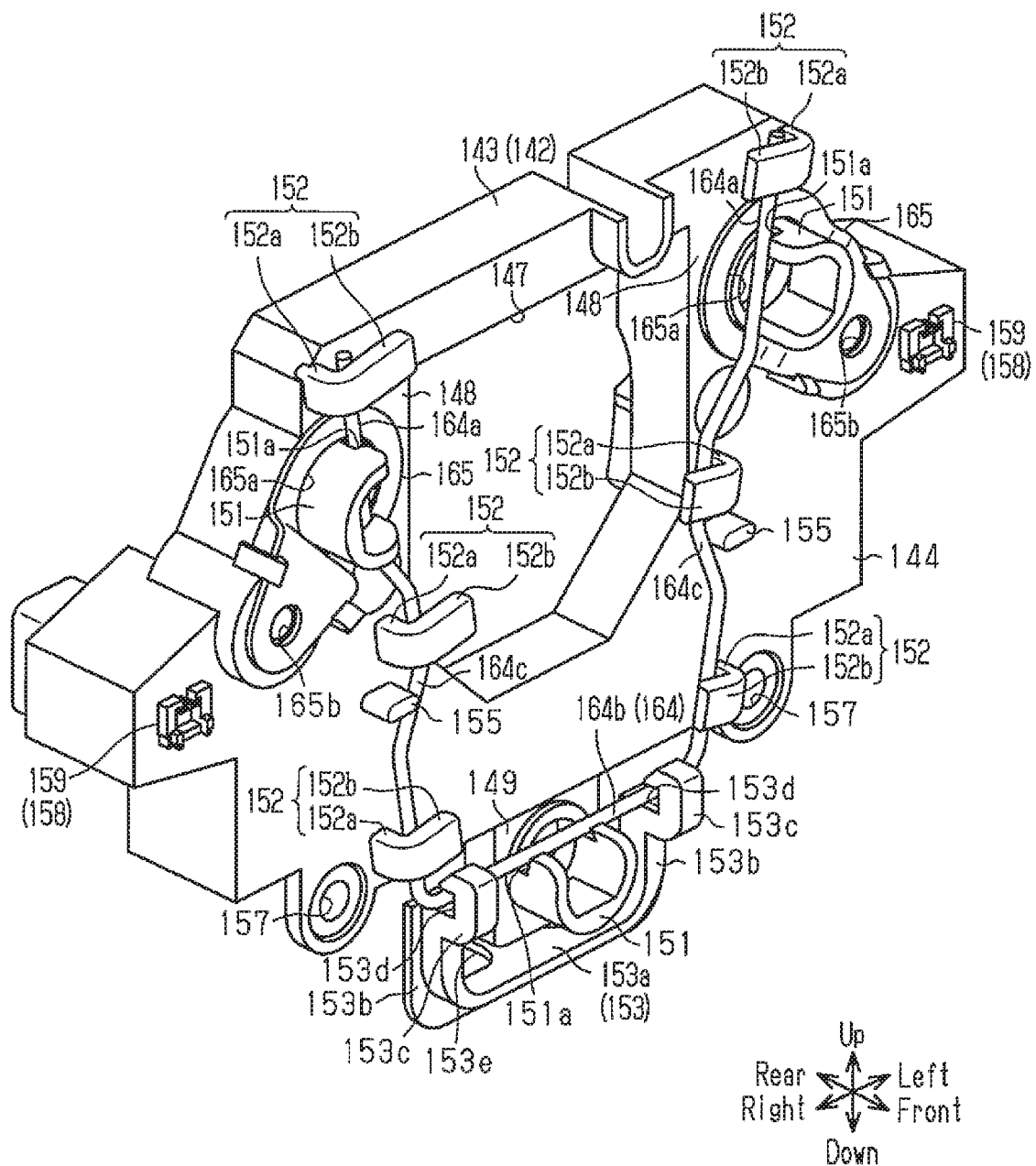
FIG. 12 is a perspective view of the control device of FIG. 11 as viewed from the front of the vehicle.

As shown in FIGS. 10A, 11, and 12, a polygonal opening portion 147 is formed at the central portion of the mounting member 143 behind the boss constituting section 121. The opening portion 147 extends through the mounting member 143 in the front-rear direction. The mounting member 143 includes three support portions 148, 149 around the opening portion 147. Among the support portions 148, 149, two support portions 148 are located in the vicinity of the rear of the spoke constituting sections 122, and the support portion 149 is located in the vicinity of the rear of the coupling portion 123. The support portions 148, 149 include through-holes 150, which extend through the support portions 148, 149 in the front-rear direction.

Figure 18:
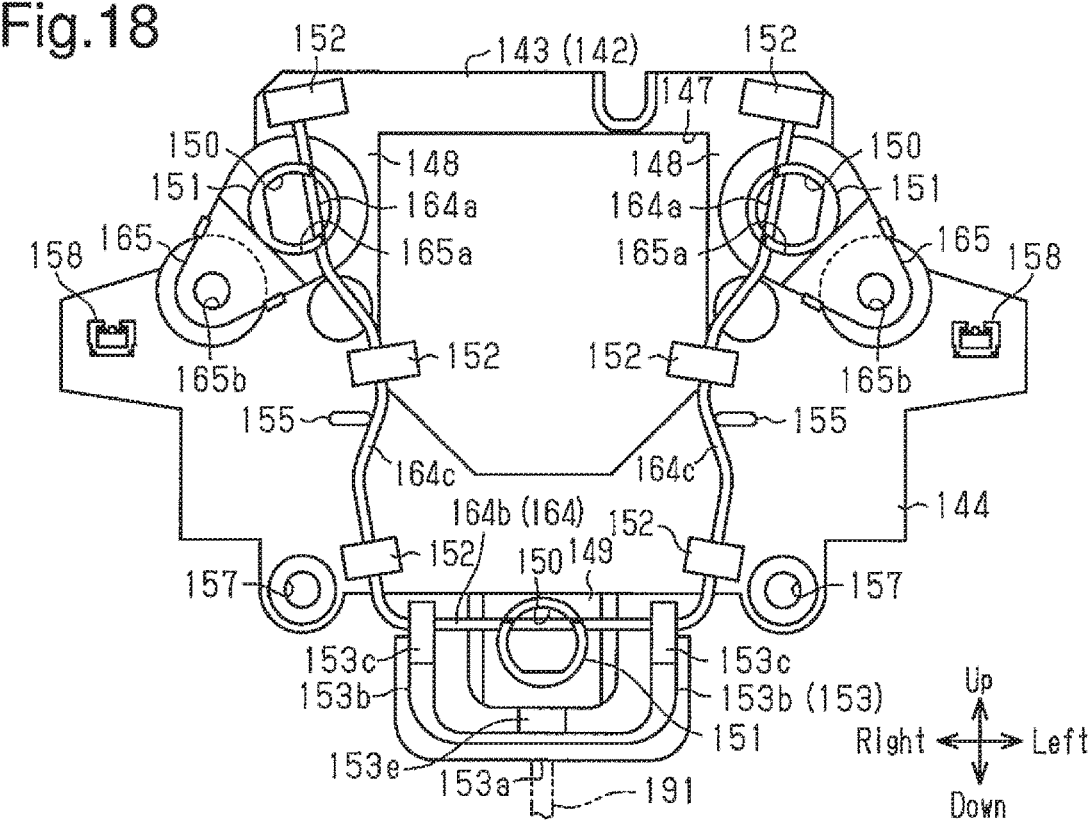
FIG. 18 is a rear view of the control device in which the snap spring is mounted on the mounting member according to the second embodiment.

As shown in FIGS. 12 and 18, a snap spring 164 is retained in front of the mounting member 143. The snap spring 164 is formed of a metal wire including, for example, conductive spring steel. The snap spring 164 includes a pair of vertical spring portions 164a and a single lateral spring portion 164b. The pair of vertical spring portions 164a face each other in the longitudinal direction of the spoke constituting sections 122 (left-right direction in FIG. 18) with the opening portion 147 located in between. The lateral spring portion 164b extends in the longitudinal direction of the spoke constituting sections 122. As shown in FIGS. 10A and 18, the vertical spring portions 164a are located in the vicinity of the rear of the spoke constituting sections 122 and extend in a direction substantially orthogonal to the longitudinal direction of the spoke constituting sections 122 (up-down direction in FIG. 18). The lateral spring portion 164b is located in the vicinity of the rear of the coupling portion 123 and extends in the longitudinal direction of the spoke constituting sections 122. The lateral spring portion 164b couples one end (lower end in FIG. 18) of each vertical spring portion 164a to one end of the other vertical spring portion 164a. The intermediate section in the longitudinal direction of each vertical spring portion 164a curves to bulge toward the opening portion 147 in such a manner that the intermediate section is closer to the opening portion 147 than other sections. Each intermediate section includes an inclined section 164c, which is inclined toward the ring portion 116 as the inclined section 164c approaches the lateral spring portion 164b. Part of each vertical spring portion 164a and part of the lateral spring portion 164b are located in front of the corresponding through-hole 150.

As shown in FIGS. 12 and 18, each through hole 150 is provided with a retaining portion 151 formed on the front wall 144. Each retaining portion 151 projects forward from the circumference of the corresponding through-hole 150 on the front wall 144. Each retaining portion 151 is substantially cylindrical and opens toward the opening portion 147. Each retaining portion 151 includes a notch 151a formed on both edges in the circumferential direction of the opening of the retaining portion 151 at the boundary between the retaining portion 151 and the front wall 144.

Figure 17:
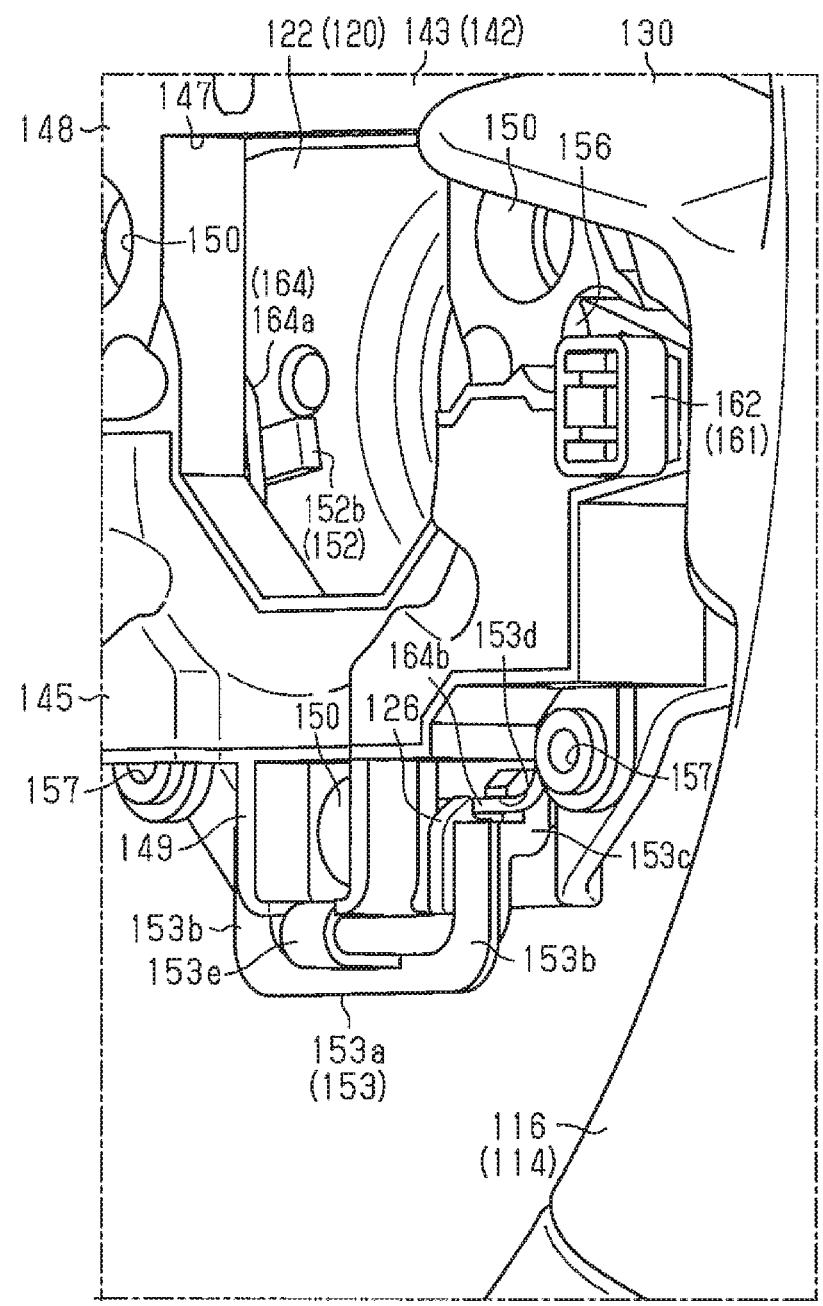
FIG. 17 is a partial perspective view illustrating a state in which the control device is mounted on the metal core according to the second embodiment as viewed from the rear of the vehicle.

As shown in FIGS. 10A, 10B, and 17, the pair of restricting portions 126, which are provided on the coupling portion 123 of the metal core 120, are located behind the lateral spring portion 164b at positions that face each other in the longitudinal direction of the spoke constituting sections 122 with the through-hole 150 located in between.

As shown in FIGS. 12 and 18, retaining portions 152 are formed on the front wall 144 at positions separate from each other in the longitudinal direction of each vertical spring portion 164a. Each retaining portion 152 includes a base 152a, which projects forward from the front wall 144 on the opposite side of the vertical spring portion 164a from the opening portion 147, and a holding portion 152b, which extends from the front end of the base 152a toward the opening portion 147.

As shown in FIGS. 11 and 12, a release portion 153 is provided around the support portion 149. The release portion 153 includes a manipulation portion 153a, a pair of transmission portions 153b, and an elastic coupling portion 153e. The manipulation portion 153a is located below the support portion 149 and extends in the longitudinal direction of the spoke constituting sections 122. Each transmission portion 153b extends from one of the ends of the manipulation portion 153a toward the opening portion 147. The transmission portions 153b are located to sandwich the support portion 149 in the longitudinal direction of the spoke constituting sections 122. The transmission portions 153b are separate from the support portion 149. Each transmission portion 153b includes a retaining portion 153c at the distal end of the transmission portion 153b. Each retaining portion 153c includes a recess 153d, which opens rearward. The elastic coupling portion 153e is curved to be substantially C-shaped as viewed from the side. The elastic coupling portion 153e couples the center portion in the longitudinal direction of the manipulation portion 153a and the support portion 149. The elastic coupling portion 153e is elastically deformable in a direction to approach and separate from the opening portion 147.

The snap spring 164 is elastically deformed slightly in a direction in which the distance between the vertical spring portions 164a is reduced. Each vertical spring portion 164a is inserted in the gap between the holding portion 152b of each retaining portion 152 and the front wall 144 and contacts the base 152a due to the elastic restoration force. The vertical spring portions 164a and the lateral spring portion 164b are engaged with the notches 151a of the retaining portions 151. The lateral spring portion 164b is further engaged with the recesses 153d of the pair of retaining portions 153c, which are located on both sides of the retaining portion 151.

Furthermore, the front wall 144 includes two protrusions 155, which project forward. The two protrusions 155 are located on both sides of the opening portion 147 and face each other in the longitudinal direction of the spoke constituting sections 122. Each protrusion 155 contacts the inclined section 164c of the corresponding vertical spring portion 164a from the side further from the opening portion 147.

The mounting member 143 includes screw insertion holes 156 formed at positions behind the threaded bores 124 of the spoke constituting sections 122. The screw insertion holes 156 extend through the mounting member 143 in the front-rear direction. The mounting member 143 includes screw insertion holes 157 formed at positions behind the threaded bores 125 of the coupling portion 123. The screw insertion holes 157 extend through the mounting member 143 in the front-rear direction.

As shown in FIGS. 11, 12, and 16, the control device 142 includes a pair of front second connectors 158 and a pair of rear second connectors 161. Each front second connector 158 includes a front connector housing 159 and a front pin 160. The front connector housing 159 of each front second connector 158 projects forward from the front wall 144 with the inside of the mounting member 143 communicating with the outside of the mounting member 143 and is formed integrally with the front wall 144. The front pin 160 of each front second connector 158 extends through the control substrate 146 and projects toward the front connector housing 159.

Each rear second connector 161 includes a rear connector housing 162 and a rear pin 163. The rear connector housing 162 of each rear second connector 161 projects rearward from the rear wall 145 with the inside of the mounting member 143 communicating with the outside of the mounting member 143 and is formed integrally with the rear wall 145. The rear pin 163 of each rear second connector 161 extends through the control substrate 146 at a position adjacent to the front pin 160 in a direction along the surface of the control substrate 146 (left-right direction in FIG. 16) and projects toward the rear connector housing 162.

The front pins 160 and the rear pins 163 are typically press-fit pins. FIG. 16 illustrates one of the front pins 160 and one of the rear pins 163, which are arranged in a direction orthogonal to the sheet of the drawing.

As shown in FIGS. 9, 11, and 12, a metal sheet 165 made of conductive metal is located on the front surface of each support portion 148. More specifically, each metal sheet 165 is located in a region extending over the through-hole 150 and the screw insertion hole 156 of each support portion 148. A hole 165a is formed in a section of each metal sheet 165 corresponding to the retaining portion 151. The retaining portion 151 is inserted in the hole 165a. Each metal sheet 165 contacts the vertical spring portion 164a on the surrounding portion of the hole 165a. A screw insertion hole 165b is formed in each metal sheet 165 at a position corresponding to the screw insertion hole 156.

The rear wall 145 or the front wall 144 of the mounting member 143 is positioned with respect to the metal core 120 by a non-illustrated positioning portion. As shown in FIG. 10B, the positioning places each front second connector 158 at the rear of a section in the corresponding window 127 of the metal core 120. Fasteners, which are screws 166 in this embodiment, are inserted in the screw insertion holes 156 from the rear of the mounting member 143. The inserted screws 166 are each screwed to the threaded bore 124 (refer to FIG. 9) of the corresponding spoke constituting section 122 of the metal core 120. Thus, the mounting member 143 is fastened to the spoke constituting sections 122 with the metal sheets 165 located in between. The metal sheets 165 contact the rear surface of the metal core 120 at sections around the screw insertion holes 165b. The snap spring 164 is electrically connected to the metal core 120 through the metal sheets 165. Fasteners, which are screws 166 in this embodiment, are inserted in the screw insertion holes 157 from the rear of the mounting member 143. The inserted screws 166 are screwed to the threaded bores 125 (refer to FIG. 9) of the coupling portion 123. Thus, the mounting member 143 is fastened to the coupling portion 123.

As shown in FIGS. 10B and 16, each front first connector 134 is inserted in the corresponding window 127 from the front of each spoke constituting section 122 and is coupled to the front connector housing 159 and the front pin 160 of the corresponding front second connector 158. This electrically connects each front functional device 131 to the control device 142 without a harness provided between the front functional case 132 and the mounting member 143.

Furthermore, as shown in FIGS. 10A and 16, each rear first connector 140 is coupled to the rear connector housing 162 and the rear pin 163 of the corresponding rear second connector 161 from the rear of the rear wall 145 of the mounting member 143. This electrically connects each rear functional device 137 to the control device 142 without a harness provided between the rear functional case 138 and the mounting member 143.

Figure 13:
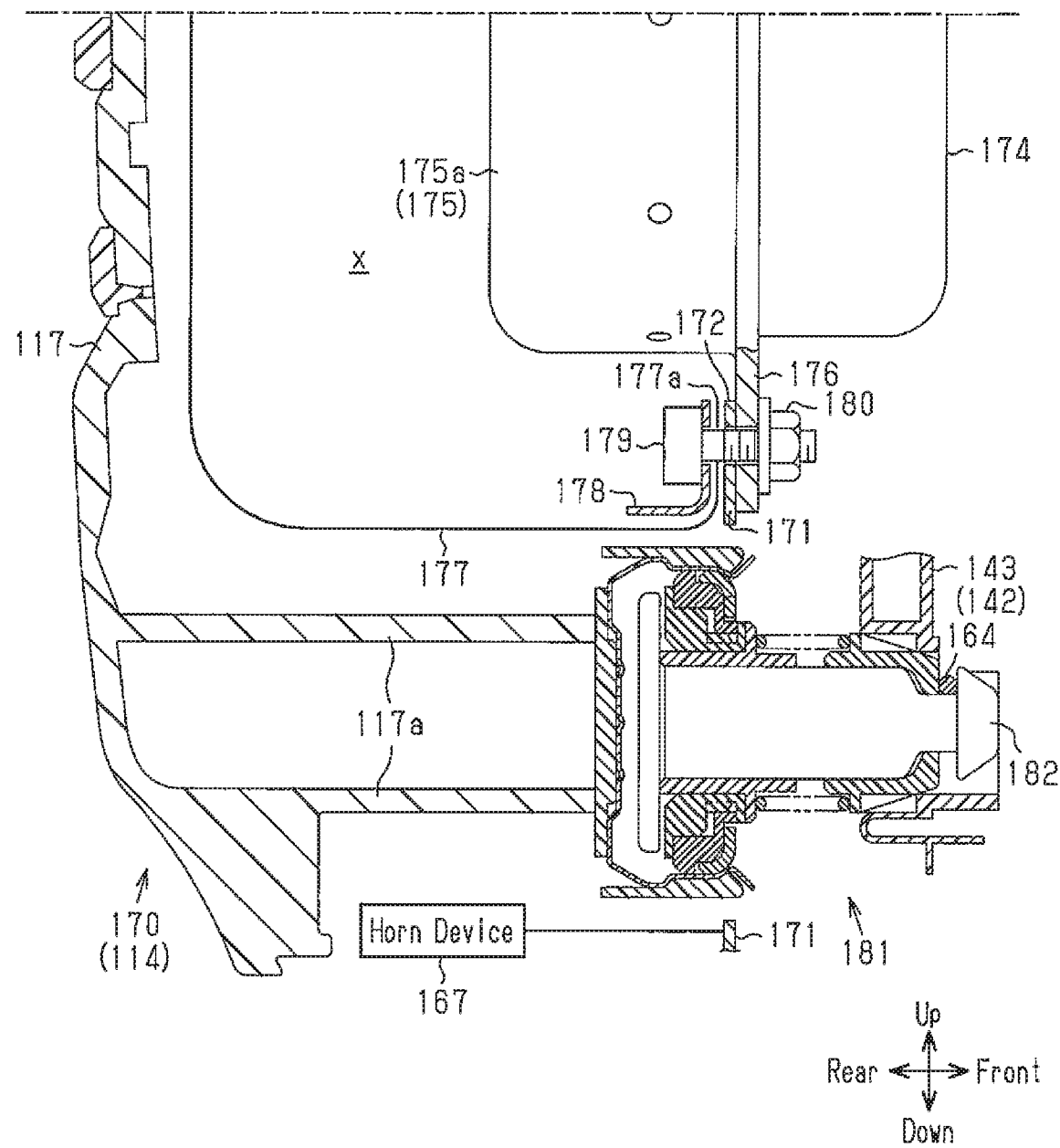
FIG. 13 is a partial cross-sectional side view of the steering wheel according to the second embodiment.

As shown in FIG. 13, the vehicle 110 is provided with the horn device 167. The vehicle 110 is also provided with horn switch mechanisms 181 for activating the horn device 167 by pressing the airbag apparatus 170. The number of the horn switch mechanisms 181 is equal to the number of the through-holes 150. The horn switch mechanisms 181 have the same structure as each other and are electrically connected to the horn device 167. Each horn switch mechanism 181 is mounted on the mounting member 143 at the support portions 148, 149 with a snap-fit structure. The airbag apparatus 170 is supported by the metal core 120 via the horn switch mechanisms 181 and the mounting member 143. As described above, each horn switch mechanism 181 functions to support the airbag apparatus 170 and functions as the switch of the horn device 167. Furthermore, each horn switch mechanism 181 functions to reduce, or control, the vibration of the steering wheel 114 utilizing the airbag apparatus 170.

The airbag apparatus 170 and the horn switch mechanisms 181 will now be described.

<Airbag Apparatus 170>

As shown in FIG. 13, the airbag apparatus 170 is constituted by assembling the pad portion 117, an inflator 174, an airbag 177, and a ring retainer 178 to a bag holder 171. The main part of the airbag apparatus 170 is located rearward of the mounting member 143.

The bag holder 171 is formed of a conductive metal plate and includes a circular opening 172 at the central portion. The pad portion 117 is located at the rear of the bag holder 171 and is engaged with the bag holder 171 with, for example, hooks. The space surrounded by the pad portion 117 and the bag holder 171 configures a bag storing space x. The pad portion 117 includes three switch support portions 117a for supporting the horn switch mechanisms 181 from the rear side. A mounting hole 173 is formed in the bag holder 171 at a position in front of each switch support portion 117a (refer to FIG. 14).

The inflator 174 includes a short columnar main body 175 and a flange 176, which is formed on the outer circumference of the main body 175. Part of the main body 175 rearward of the flange 176 configures a gas outlet 175a, which discharges inflation gas. The main body 175 is inserted through the circular opening 172 of the bag holder 171 from the front in such a manner that the gas outlet 175a projects toward the bag storing space x. Furthermore, the flange 176 contacts the periphery of the circular opening 172 from the front.

The airbag 177 is located in the bag storing space x in a folded state such that the airbag 177 is capable of being deployed and inflated. The airbag 177 includes a bag opening 177a. The ring retainer 178 is placed in the airbag 177 through the bag opening 177a. The ring retainer 178 includes mounting screws 179. The mounting screws 179 are inserted through the periphery of the bag opening 177a, the bag holder 171, and the flange 176 from the rear. Furthermore, nuts 180 are fastened to the inserted mounting screws 179 from the front, so that the airbag 177 is secured to the bag holder 171 using the ring retainer 178. At the same time, the inflator 174 is secured to the bag holder 171.

The airbag apparatus 170 configured as described above is used as the damper mass of a dynamic damper.

<Horn Switch Mechanism 181>

Figure 14:
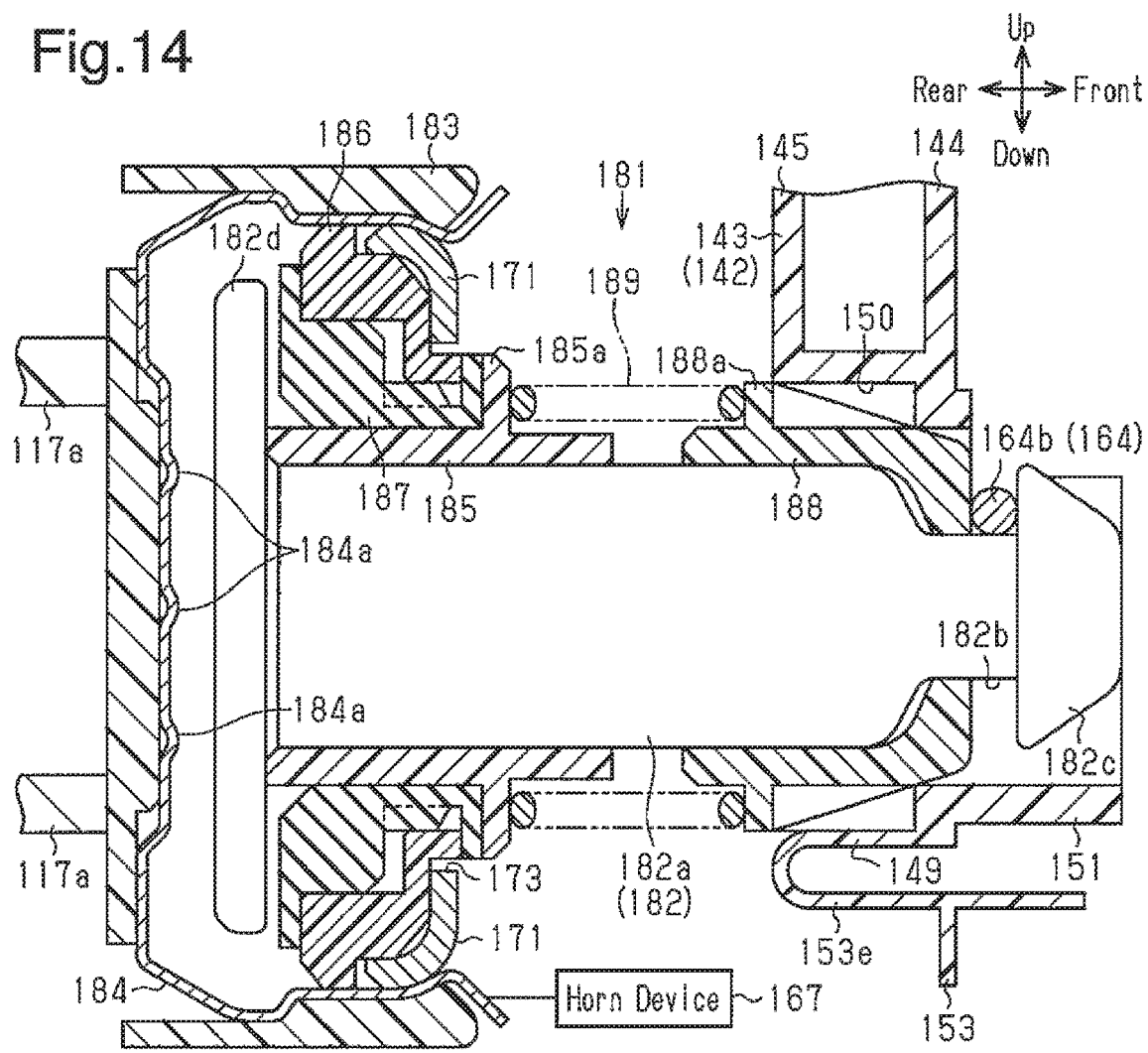
FIG. 14 is an enlarged partial cross-sectional side view of the horn switch mechanism of FIG. 13 and the surrounding structure.

FIG. 14 illustrates the horn switch mechanism 181 mounted on the through-hole 150 of the support portion 149. As shown in FIGS. 13 and 14, each horn switch mechanism 181 includes a snap pin 182, a contact holder 183, a movable contact portion 184, a pin holder 185, a damper holder 186, an elastic member 187, a support assisting member 188, and an urging member.

The snap pin 182 is made of a conductive metal material. The snap pin 182 includes a shaft portion 182a, which extends in the front-rear direction, and the shaft portion 182a is inserted in the mounting hole 173 of the bag holder 171. An annular locking groove 182b is formed at a position slightly separate rearward from the front end face of the shaft portion 182a. The section of the shaft portion 182a between the front end face and the locking groove 182b constitutes a support portion 182c of the shaft portion 182a. A flange portion 182d is formed on the rear end of the shaft portion 182a. The rear end portion of the snap pin 182, that is, the rear end portion of the shaft portion 182a and the flange portion 182d configure a fixed contact portion.

The contact holder 183 is made of an insulative plastic material. The contact holder 183 is tubular and has a closed rear end. The movable contact portion 184 is formed by bending conductive band-shaped spring steel and is mounted along the inner wall of the contact holder 183. Contact projections 184a are formed on the rear portion of the movable contact portion 184. The front end portion of the movable contact portion 184 contacts the bag holder 171.

The pin holder 185 is made of an insulative plastic material. The pin holder 185 is tubular and has open ends. The pin holder 185 covers the shaft portion 182a of the snap pin 182 to be slidable in the front-rear direction. An annular seat portion 185a is formed on the outer circumference of the pin holder 185. The damper holder 186 is made of an insulative plastic material and is mounted on the contact holder 183.

The elastic member 187 is made of an elastic material, such as rubber (for example, EPDM rubber and silicone rubber) and elastomer, into an annular shape. The elastic member 187 is located between the pin holder 185 and the damper holder 186 and is used as the spring of a dynamic damper. By adjusting the size (the measurements in the radial direction and the front-rear direction) of the elastic member 187, the resonance frequency of the dynamic damper in the up-down direction or the left-right direction is set to a target frequency to be suppressed in the up-down direction or the left-right direction of the steering wheel 114, in other words, the desired frequency to be damped.

The support assisting member 188 is made of an insulative plastic material and is mounted on the snap pin 182 so that the support assisting member 188 is prevented from falling off the snap pin 182. An annular plate-like seat portion 188a is formed on the outer circumference of the support assisting member 188. The urging member is constituted by a coil spring 189. The coil spring 189 is wound around the shaft portion 182a of the snap pin 182, part of the pin holder 185 forward of the seat portion 185a, and part of the support assisting member 188 rearward of the seat portion 188a. The coil spring 189 is arranged in a compressed state between the seat portions 185a, 188a. Thus, the coil spring 189 urges the pin holder 185 rearward and the support assisting member 188 forward.

As described above, independent components, that is, the snap pin 182, the contact holder 183, the movable contact portion 184, the pin holder 185, the damper holder 186, the elastic member 187, the support assisting member 188, and the coil spring 189 are unitized, and the horn switch mechanism 181 is formed as an assembly. Accordingly, when installed or replaced, the unitized horn switch mechanism 181 can be handled as an integral assembly.

The airbag apparatus 170 is assembled to the mounting member 143 with the horn switch mechanisms 181. The snap pin 182 of each horn switch mechanism 181 is inserted in the corresponding through-hole 150 of the mounting member 143. The section of the snap spring 164 located forward of each through-hole 150 is sandwiched between the support portion 182c and the support assisting member 188 from the front and the rear of the snap spring 164. This causes the snap spring 164 to be engaged with the locking groove 182b of the snap pin 182. The snap pins 182 support the airbag apparatus 170 on the mounting member 143.

The mounting member 143 is made of plastic and is nonconductive. However, in the horn switch mechanism 181 mounted on the through-hole 150 of each support portion 148, the conductive metal sheet 165 contacts the vertical spring portion 164a, which is engaged with the locking groove 182b of the snap pin 182, and the metal core 120. The horn switch mechanisms 181 are electrically connected to the metal core 120 through the snap spring 164 and the metal sheets 165.

Moreover, parts of the metal sheets 165 contact the metal core 120 at positions where the mounting member 143 is fastened to the metal core 120 with the screws 166. Thus, the state in which parts of the metal sheets 165 contact the metal core 120 is reliably maintained.

Operation and advantages of the steering wheel 114 according to the second embodiment configured as described above will now be described.

Operation and advantages of the connecting process will be described below.

In the second embodiment, as shown in FIG. 16, the rear portion of each front first connector 134 is exposed to the outside of the front functional case 132, and the front portion of each rear first connector 140 is exposed to the outside of the rear functional case 138. Furthermore, the front portion of each front second connector 158 and the rear portion of each rear second connector 161 are exposed to the outside of the mounting member 143. Thus, the same advantages as the first embodiment are achieved in the connecting process.

That is, each front functional device 131 is brought close to the mounting member 143 from the front, and each front first connector 134 is coupled to the corresponding front second connector 158 through the window 127 of the metal core 120 (not shown in FIG. 16), so that each front functional device 131 is connected to the control device 142 without a harness between the front functional case 132 and the mounting member 143. This facilitates the connecting of each front functional device 131 to the control device 142.

Each rear functional device 137 is brought close to the control device 142 from the rear, and each rear first connector 140 is coupled to the corresponding rear second connector 161, so that each rear functional device 137 is connected to the control device 142 without a harness between the rear functional case 138 and the mounting member 143. This facilitates the connecting of each rear functional device 137 to the control device 142.

Operation and advantages in the assembling of the airbag apparatus 170 will be described below.

The assembling of the airbag apparatus 170 to the mounting member 143 with the horn switch mechanisms 181 is performed as follows.

In the assembling process, as shown in FIG. 14, the snap pin 182 of each horn switch mechanism 181 is inserted in the corresponding through-hole 150 of the mounting member 143 from the rear. The insertion causes the support portion 182c of the snap pin 182 to contact the snap spring 164 located in front of the through-hole 150. When the snap pin 182 and the associated parts are moved further forward against the urging force of the snap spring 164, the snap spring 164 is elastically deformed toward the opening portion 147. When the snap pin 182 is moved to a position where the locking groove 182b faces the snap spring 164, the snap spring 164 acts to enter the locking groove 182b due to its own elastic restoration force.

Meanwhile, the front end of the support assisting member 188, which is urged forward by the coil spring 189, is in the locking groove 182b. Thus, in the process of entering the locking groove 182b, the snap spring 164 enters the space between the support assisting member 188 and the support portion 182c while compressing the coil spring 189 rearward. The entry of the snap spring 164 causes the support assisting member 188 to be located rearward of the snap spring 164 in the locking groove 182b. Part of the snap spring 164 located forward of the through-hole 150 is sandwiched from the front and the rear by the support portion 182c and the support assisting member 188. In this manner, when the snap spring 164 locks the snap pin 182 to the mounting member 143, each horn switch mechanism 181 is fastened to the mounting member 143, and the airbag apparatus 170 is mounted on the mounting member 143. This structure is referred to as a snap-fit structure. The structure includes the snap pin 182, which includes the locking groove 182b, and the snap spring 164 as components, and the snap pin 182 is locked to the mounting member 143 by the elasticity of the snap spring 164 as the snap pin 182 is inserted in the through-hole 150. The assembling using the snap-fit structure enables the airbag apparatus 170 to be mounted on the mounting member 143 by a simple process of moving the airbag apparatus 170 forward together with the snap pins 182 with the snap pins 182 inserted in the through-holes 150.

Operation and advantages in removing the airbag apparatus 170 will be described below.

Before an external force is applied to the release portion 153 of the mounting member 143, the snap spring 164 is held by the retaining portions 152 in a state in which the snap spring 164 is elastically deformed slightly in a direction in which the distance between the vertical spring portions 164a is reduced as shown in FIG. 18.

In removing the airbag apparatus 170, a long release tool 191, such as a hard rod, is inserted from the outside of the steering wheel 114 between the metal core 120 and the airbag apparatus 170. When the intermediate section in the longitudinal direction of the manipulation portion 153a is pushed toward the opening portion 147 by the distal end of the release tool 191, a force toward the opening portion 147 is applied to the release portion 153. The force is transmitted to the lateral spring portion 164b of the snap spring 164 through the transmission portions 153b. Since the transmission portions 153b are formed at positions facing each other in the longitudinal direction of the spoke constituting sections 122 with the elastic coupling portion 153e located in between, the force is transmitted substantially uniformly to the positions of the lateral spring portion 164b where the retaining portions 153c contact.

Figure 19:
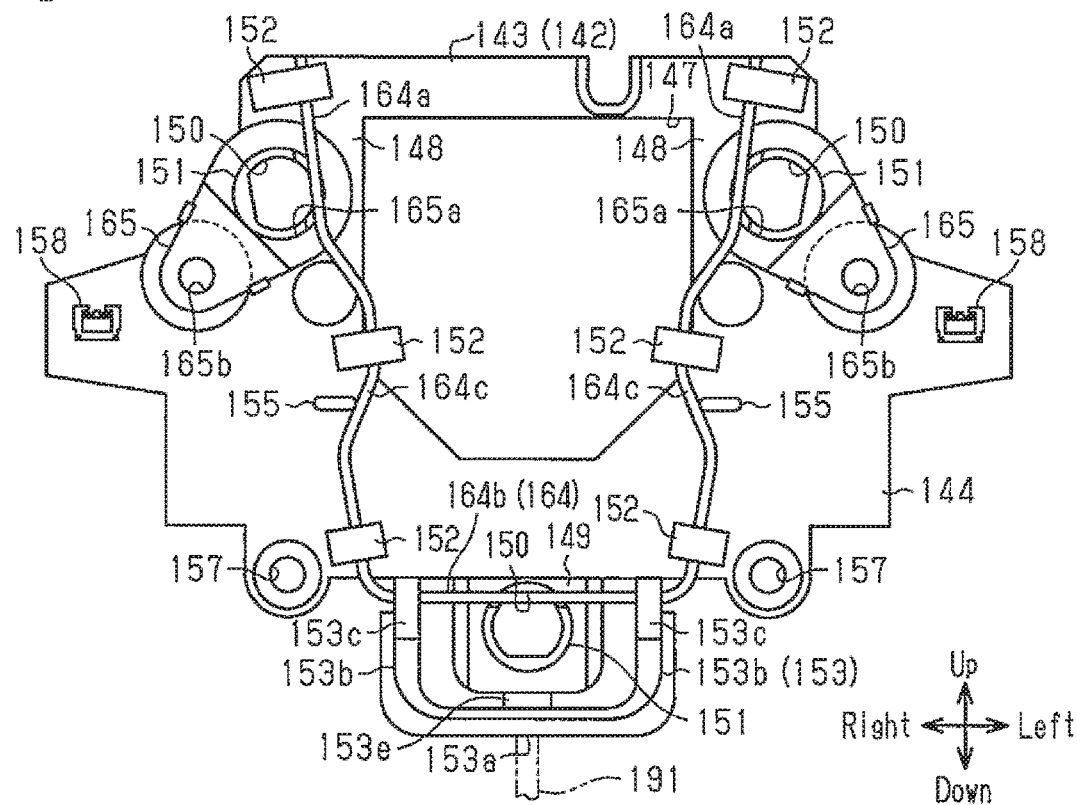
FIG. 19 is a rear view illustrating a state in which the release portion of the mounting member of FIG. 18 is pressed.

The force causes the elastic coupling portion 153e to be elastically deformed as shown in FIG. 19, so that the manipulation portion 153a together with the transmission portions 153b are displaced toward the opening portion 147, and the lateral spring portion 164b of the snap spring 164 is pushed toward the opening portion 147. Part of the lateral spring portion 164b located in front of the through-hole 150 of the support portion 149 is displaced toward the opening portion 147 and is detached from the locking groove 182b of the snap pin 182. The lateral spring portion 164b thus loses the force to lock the snap pin 182.

With the displacement of the lateral spring portion 164b, each vertical spring portion 164a is displaced in a direction to separate from the support portion 149 (upward in FIG. 19) in the longitudinal direction of the vertical spring portion 164a. The position where the inclined section 164c of each vertical spring portion 164a contacts the corresponding protrusion 155 is changed in accordance with the displacement. The inclined sections 164c receive forces from the protrusions 155 in a direction to reduce the distance between the vertical spring portions 164a. This force causes each vertical spring portion 164a to be elastically deformed toward the opposed vertical spring portion 164a at the boundary between the vertical spring portion 164a and the lateral spring portion 164b. The position at which each vertical spring portion 164a is held by the retaining portion 152 is changed to approach the opposed vertical spring portion 164a. Part of each vertical spring portion 164a located in front of the through-hole 150 of the corresponding support portion 148 is also displaced to approach the opposed vertical spring portion 164a and is detached from the locking groove 182b of the corresponding snap pin 182. In the second embodiment, the vertical spring portions 164a are elastically deformed by approximately the same amount in the opposite directions. Thus, the vertical spring portions 164*a* are detached from the locking grooves 182*b* of the snap pins 182 inserted in the through-holes 150 of the support portions 148 substantially at the same time. The vertical spring portions 164*a* thus lose the force to lock the snap pins 182.

In this manner, since the vertical spring portions 164*a* and the lateral spring portion 164*b* lose the force to lock the snap pins 182 substantially at the same time, all the three snap pins 182 are removed from the corresponding through-holes 150, and the airbag apparatus 170 is removed from the mounting member 143 smoothly.

Operation and advantages in reducing the mounting space will be described below.

Vehicle steering wheels that include the metal core constituting the framework and the control device, which controls activation of the vehicle-mounted equipment, have been proposed (for example, refer to Japanese Laid-Open Patent Publication No. 2008-56093). In particular, in Japanese Laid-Open Patent Publication No. 2008-56093, the control device is mounted on part of the lower cover that is unlikely to influence the deformation property of the metal core. In view of protecting the driver, if the steering wheel receives an impact from the driver during, for example, a frontal collision of the vehicle, the metal core is required to be deformed to absorb the impact. The configuration of the publication prevents the hard control device from affecting the deformation property of the metal core.

In a typical steering wheel, the airbag apparatus is mounted on the pad portion and functions to protect the driver from an impact of a collision during, for example, a frontal collision of the vehicle. It has been required to additionally apply many functions to the steering wheel, that is, multifunction steering wheels have been desired. Additionally, in view of improving the design, the reduction in the size of the pad portion has been desired.

However, the number of parts mounted on the steering wheel is increased due to the increase in the functions, and a space for placing new parts needs to be provided. For this, it is important to reduce the space for placing the existing parts and devices, that is, the airbag apparatus and the control device in this case. If the pad portion is reduced in size, the importance of reducing the space for mounting the airbag apparatus and the control device is further increased.

Therefore, a steering wheel that requires less space for mounting the airbag apparatus and the control device has been desired.

In this respect, in the second embodiment, as shown in FIGS. 10A, 10B, and 13, the mounting member 143 (control case), which constitutes the housing of the control device 142, is mounted on the metal core 120. In other words, part of the control device 142 is constituted by the mounting member 143 (control case). The control device 142 is mounted on the metal core 120 with the mounting member 143. That is, when the mounting member 143 is mounted on the metal core 120, the control device 142 is mounted on the metal core 120.

The main part of the airbag apparatus 170 is located rearward of the mounting member 143 and is mounted on the mounting member 143. In other words, the airbag apparatus 170 is mounted on the metal core 120 via the mounting member 143. In this manner, the control device 142 and the airbag apparatus 170 are mounted on the metal core 120 in a state in which the control device 142 and the airbag apparatus 170 are arranged in the front-rear direction.

Thus, compared with a case in which the control device 142 and the airbag apparatus 170 are separately mounted on different positions from each other, the space required for placing the control device 142 and the airbag apparatus 170 is reduced. In particular, the dimension of the space for placing the control device 142 and the airbag apparatus 170 in a direction orthogonal to the steering shaft 115 is reduced.

As a result, even if the number of parts assembled to the steering wheel 114 is increased as the function of the steering wheel 114 is increased, a space for placing new parts is provided.

Additionally, in the second embodiment, each front functional device 131 and each rear functional device 137 are connected to the control device 142 from the front and the rear as shown in FIG. 16. Furthermore, the rear second connectors 161 are located behind the front second connectors 158. Thus, the dimension of the space required for connecting the front functional devices 131 and the rear functional devices 137 to the control device 142 in the direction along the surface of the control substrate 146 (left-right direction in FIG. 16) is less than the dimension when the front second connectors 158 and the rear second connectors 161 are provided on the same side in the thickness direction (the front side or the rear side) of the control substrate 146. This reduces the space required for the connection in the direction along the surface of the control substrate 146.

Operation and advantages in driving the vehicle 110 in a normal state will be described below.

During normal operation, in which no impact is applied to the vehicle 110 from the front due to, for example, a frontal collision, the airbag apparatus 170 discharges no inflation gas from the gas outlet 175*a* of the inflator 174 as shown in FIG. 13. Thus, the airbag 177 is maintained in the folded state.

As shown in FIG. 14, when the airbag apparatus 170 is not pushed down in the normal operation, the rearward urging force of the coil spring 189 is transmitted to the pin holder 185 through the seat portion 185*a*. The pin holder 185 that is urged rearward contacts the flange portion 182*d* of the snap pin 182 locked to the mounting member 143 by the snap spring 164 and is limited from moving further rearward.

The urging force is transmitted to the bag holder 171 and the contact holder 183 via the damper holder 186. The urging force transmitted to the contact holder 183 is transmitted to the switch support portion 117*a*. The airbag apparatus 170 that has received the urging force in this manner is moved rearward away from the control device 142.

Along with this, the movable contact portion 184 mounted on the contact holder 183 is also urged rearward. The contact projections 184*a* are separated rearward from the fixed contact portion on the rear end portion of the snap pin 182. The movable contact portion 184 and the snap pin 182 are electrically disconnected from each other, and the horn device 167 does not operate.

At this time, the load of the airbag apparatus 170 is mainly transmitted to the pin holder 185 via the contact holder 183, the damper holder 186, and the elastic member 187. Therefore, when vibrations in the up-down direction and the left-right direction are transmitted to the steering wheel 114 in the normal operation during high-speed travelling of the vehicle 110 or idling of the vehicle-mounted engine, the vibrations are transmitted to the airbag apparatus 170 via the metal core 120, the mounting member 143, and the horn switch mechanisms 181. The airbag apparatus 170 functions as the damper mass of a dynamic damper in response to the vibrations. The elastic member 187 functions as the spring of a dynamic damper. Specifically, the elastic member 187 vibrates (resonates) in the up-down direction and the left-right direction together with the airbag apparatus 170 while being elastically deformed at the resonance frequency that is the same as or close to the target frequency of the vibration of the steering wheel 114. The resonance absorbs the vibration energy of the steering wheel 114 and suppresses (dampens) the vibrations of the steering wheel 114 in the up-down direction and the left-right direction.

Operation and advantages in manipulating the front functional devices 131 and the rear functional devices 137 will be described below.

As shown in FIG. 16, in each front functional device 131, the functional substrate 133 is electrically connected to the front first connector 134 through the harness 135. In each rear functional device 137, the functional substrate 139 is electrically connected to the rear first connector 140 through the harness 141. Furthermore, the coupling of the front first connector 134 to the front second connector 158 electrically connects each front functional device 131 to the control device 142. The coupling of the rear first connector 140 to the rear second connector 161 electrically connects each rear functional device 137 to the control device 142.

Therefore, when there is input to any of the front functional devices 131 and the rear functional devices 137 through the manipulation portions 130, 136 (refer to FIGS. 7 and 8) in a state in which the driver is grasping the ring portion 116, the control device 142 controls the corresponding vehicle-mounted equipment. The vehicle-mounted equipment is activated in a manner corresponding to the input. That is, the input for activating the vehicle-mounted equipment can be performed at hand.

When there is input to the front functional devices 131 and the rear functional devices 137 through the manipulation portions 130, 136, when there is variation in the dimensions of the components of the front functional devices 131 and the rear functional devices 137, or when the steering wheel 114 is turned, stress may be transmitted from the functional substrate 133 to the front first connector 134. Alternatively, stress may be transmitted from the functional substrate 139 to the rear first connector 140.

In this respect, in the second embodiment, the harness 135, which connects the functional substrate 133 to the front first connector 134, is slack, and the harness 141, which connects the functional substrate 139 to the rear first connector 140, is slack. For this reason, like the first embodiment, when the stress is applied from the functional substrate 133, the harness 135 is deformed to absorb some of the stress. When the stress is applied from the functional substrate 139, the harness 141 is deformed to absorb some of the stress. The stress transmitted from the functional substrate 133 to the front first connector 134 and the stress transmitted from the functional substrate 139 to the rear first connector 140 are reduced by the amount of the stress that has been absorbed. The state in which the functional substrate 133 is electrically connected to the front first connector 134 is reliably maintained. The state in which the functional substrate 139 is electrically connected to the rear first connector 140 is reliably maintained.

Operation and advantages in pushing down the airbag apparatus 170 will be described below.

Figure 15:
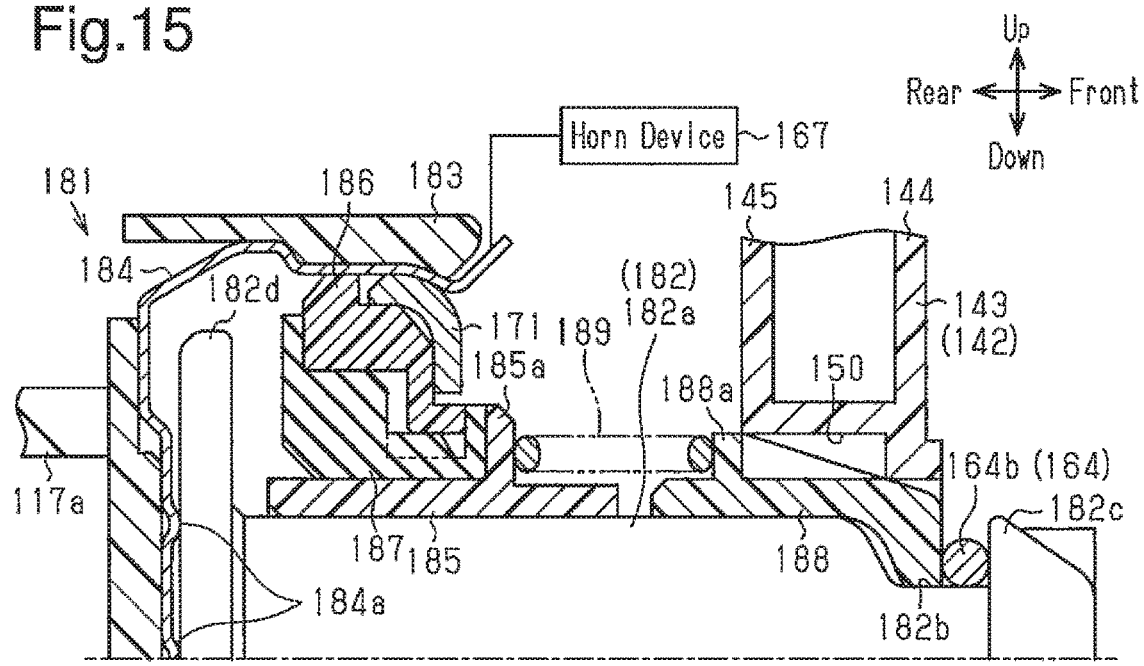
FIG. 15 is a partial cross-sectional side view of the horn switch mechanism and the surrounding structure when the airbag apparatus is pressed from the state of FIG. 14.

As shown in FIG. 15, when the airbag apparatus 170 is pushed down to activate the horn device 167 during the normal operation, the force applied to the airbag apparatus 170 is transmitted to the movable contact portion 184 and the damper holder 186 via the contact holder 183 of at least one of the horn switch mechanisms 181. This force presses and moves the damper holder 186 forward. The movement of the damper holder 186 is transmitted to the pin holder 185 via the seat portion 185*a*. Such transmission of force causes the pin holder 185 to slide forward along the shaft portion 182*a* of the snap pin 182 against the coil spring 189. The movable contact portion 184 moves forward together with the contact holder 183.

When at least one of the contact projections 184*a* of the movable contact portion 184 comes into contact with the fixed contact portion of the snap pin 182, the metal core 120, which is grounded to the body of the vehicle 110, and the bag holder 171 are electrically connected to each other through the metal sheet 165, the snap spring 164, the snap pin 182, and the movable contact portion 184. The electrical connection closes the circuit of the horn switch mechanism 181, so that the horn device 167, which is electrically connected to the bag holder 171, is activated.

Operation and advantages when an impact is applied to the vehicle 110 from the front will be described below.

If an impact is applied to the vehicle 110 from the front due to, for example, a frontal collision during traveling of the vehicle 110, the vehicle 110 is stopped. However, the body of the driver D acts to move forward with respect to the vehicle 110 due to the inertia.

Meanwhile, the inflator 174 of the airbag apparatus 170 in FIG. 13 is activated in response to the impact, so that the inflation gas is ejected from the gas outlet 175*a*. The inflation gas is supplied to the airbag 177, unfolding (deploying) the folded airbag 177 to inflate. When the pressure applied to the pad portion 117 is increased by the airbag 177, the pad portion 117 is ruptured. The airbag 177 continues to be deployed and inflated rearward through the opening formed by the rupture. The deployed and inflated airbag 177 is located in front of the driver D, whose body is acting to lean forward due to the impact of the frontal collision, and restrains the forward leaning movement of the driver D to protect the driver D from the impact.

When the airbag 177 is inflated rearward, a rearward force is applied to the bag holder 171. The force is transmitted to the snap pin 182 of each horn switch mechanism 181 and the snap spring 164 successively. Parts of the snap spring 164 located in front of the through-holes 150 are pulled rearward.

At this time, as shown in FIGS. 12 and 18, part of each metal sheet 165 is located between the through-hole 150 of the corresponding support portion 148 and the corresponding vertical spring portion 164*a* and around the through-hole 150. The metal sheets 165 have a strength higher than the strength of the plastic mounting member 143. For this reason, the force is more appropriately received by the metal sheets 165 compared with a case in which the metal sheets 165 are not used, and each vertical spring portion 164*a* contacts the periphery of the corresponding through-hole 150 of the mounting member 143.

As shown in FIGS. 10A, 10B, and 17, the pair of restricting portions 126, which are provided on the coupling portion 123, are located at positions on opposite sides of the through-hole 150 of the support portion 149 in the longitudinal direction of the spoke constituting sections 122. The restricting portions 126 contact the lateral spring portion 164*b* from the rear. The restricting portions 126 have a strength higher than that of the plastic mounting member 143. For this reason, the force is more appropriately received by the restricting portions 126 compared with a case in which the restricting portions 126 are not provided, and the lateral spring portion 164*b* contacts the periphery of the through-hole 150 of the mounting member 143.

During the frontal collision of the vehicle 110, the steering wheel 114 receives pressure from the driver D via the airbag 177. The metal core 120 is deformed by the pressure at positions apart from the central portion to absorb the impact applied to the driver D and to protect the driver D. This is because the central portion of the metal core 120 is generally harder than other sections and resists deformation. That is, the metal core 120 is formed to deform at positions apart from the central portion.

The control device 142 is hard. Thus, depending on the place it is located, the control device 142 may influence the deformation property of the metal core 120. In this respect, in the second embodiment, the control device 142 is located behind the central portion of the metal core 120 having a high rigidity and is fastened to the metal core 120 with the screws 166 as shown in FIG. 10A. Thus, the control device 142 is unlikely to influence the deformation property of the metal core 120. When the steering wheel 114 receives an impact, the metal core 120 is deformed with the deformation property as intended or with the deformation property similar to the intended deformation property without interfering with the control device 142.

The second embodiment may be modified as follows.

In FIG. 16, the front second connectors 158 may be secured to the front surface (upper surface in FIG. 16) of the control substrate 146 of the control device 142, and the rear second connectors 161 may be secured to the rear surface (lower surface in FIG. 16) of the control substrate 146. In this case, the rear second connectors 161 may be provided behind the front second connectors 158. This reduces the mounting space in a direction along the surface of the control substrate 146.

The front second connectors 158 and the rear second connectors 161 may be provided on the same side in the thickness direction (the front side or the rear side) of the control substrate 146.

One or both of the pair of front second connectors 158 of the control device 142 may be omitted. In addition to the pair of front second connectors 158 of the control device 142, another front second connector 158 may further be provided.

Similarly, one or both of the pair of rear second connectors 161 of the control device 142 may be omitted. In addition to the pair of rear second connectors 161 of the control device 142, another rear second connector 161 may further be provided.

A second connector of the control device 142 may be provided on the side wall of the mounting member 143 in addition to the front wall 144 and the rear wall 145. Second connectors of the control device 142 may be provided on the side wall of the mounting member 143 instead of the front wall 144 and the rear wall 145. In this case, the first connector of the functional device may be coupled to the second connector provided on the side wall of the mounting member 143 from the side of the mounting member 143.

The restricting portions 126 of the coupling portion 123 of the metal core 120 may contact the lateral spring portion 164b. In this case, the snap spring 164 and the metal core 120 are electrically connected to each other through the contact portions between the coupling portion 123 and the lateral spring portion 164b.

The restricting portions 126 of the metal core 120 may be provided in front of the surrounding portion of the through-holes 150 of the support portions 148. In this case, each restricting portion 126 contacts the corresponding vertical spring portion 164a from the rear around the through-hole 150 of the support portion 148 and restricts the rearward movement of the section of the vertical spring portion 164a located in front of the through-hole 150.

The steering wheel 114 may be applied to a steering wheel of a steering apparatus in transport vehicles other than automobiles such as aircrafts, boats, and ships.

The invention claimed is:

1. A steering wheel comprising a functional device and a control device, which is electrically connected to the functional device, wherein
    the functional device includes a functional case, which constitutes a housing of the functional device,
    the control device includes a control case, which constitutes a housing of the control device,
    a first connector is partially exposed to an outside of the functional case,
    a second connector is partially exposed to an outside of the control case,
    the first connector is coupled to the second connector, so that the functional device is electrically connected to the control device without a harness between the functional case and the control case,
    the steering wheel further comprises:
        a metal core, which constitutes a framework of the steering wheel; and
        an airbag apparatus, wherein
        the control case is constituted by a mounting member,
        the control device is mounted on the metal core via the mounting member, and
        the airbag apparatus is mounted on the mounting member,
    the metal core is mounted on a rear end portion of a steering shaft extending in a front-rear direction,
    the airbag apparatus is mounted on the mounting member in such a manner that a main part of the airbag apparatus is located rearward of the mounting member,
    the steering wheel includes a snap pin, which includes a shaft portion extending in the front-rear direction,
    the airbag apparatus is supported on a rear end portion of the shaft portion,
    the snap pin is mounted on the mounting member at a front end portion of the shaft portion using a snap-fit structure,
    the mounting member includes a through-hole, which extends through the mounting member in the front-rear direction,
    the snap-fit structure includes a locking groove, which is formed on the front end portion of the shaft portion, and a snap spring,
    the snap spring is retained by the mounting member at a position forward of the through-hole and is locked to the locking groove of the snap pin inserted in the through-hole from a rear of the mounting member,
    the mounting member is made of plastic,
    the snap pin is used as one of components of a horn switch mechanism, which is electrically connected to the metal core to activate a horn device when the airbag apparatus is pressed,
    the metal core, the snap spring, and the snap pin are conductive,
    the steering wheel further comprises a conductive metal sheet, which is located between the horn switch mechanism and the metal core, and
    the metal sheet contacts the snap spring and the metal core.

2. The steering wheel according to claim 1, wherein
    the mounting member is fastened to the metal core with a fastener, and part of the metal sheet is located at a position where the mounting member is fastened to the metal core with the fastener.

3. The steering wheel according to claim 2, wherein part of the metal sheet contacts the snap spring around the through-hole.

* * * * *